(12) United States Patent
Beaver et al.

(10) Patent No.: US 10,304,108 B2
(45) Date of Patent: May 28, 2019

(54) DRIVING COMPUTER DISPLAYS WITH CUSTOMIZATION OPTIONS AND COLLECTING CUSTOMIZATION SPECIFICATIONS

(71) Applicant: Zazzle Inc., Redwood City, CA (US)

(72) Inventors: Jeffrey J. Beaver, San Francisco, CA (US); Siddharth Ananthakrishnan, Mountain View, CA (US)

(73) Assignee: ZAZZLE INC., Redwood City, CA (US)

( * ) Notice: Subject to any disclaimer, the term of this patent is extended or adjusted under 35 U.S.C. 154(b) by 485 days.

(21) Appl. No.: 15/218,459

(22) Filed: Jul. 25, 2016

(65) Prior Publication Data
US 2016/0335690 A1    Nov. 17, 2016

Related U.S. Application Data

(63) Continuation of application No. 14/316,623, filed on Jun. 26, 2014, now Pat. No. 9,400,997.
(Continued)

(51) Int. Cl.
*G06Q 30/00* (2012.01)
*G06Q 30/06* (2012.01)
(Continued)

(52) U.S. Cl.
CPC ....... *G06Q 30/0621* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 6,587,596 B1 *  7/2003  Haeberli ................. G06T 11/60
                                                        345/626
7,777,747 B1   8/2010  Krenz
(Continued)

OTHER PUBLICATIONS

Piller, F. T. (Jun. 20, 2012). Market Watch: Mi adidas Team: Adidas Launches Customization Portal for Sports Teams, Lets You Fly Your Colors. (Year: 2012).*
(Continued)

*Primary Examiner* — Abby J Flynn
(74) *Attorney, Agent, or Firm* — Hickman Palermo Becker Bingham LLP

(57) ABSTRACT

A product image depicting a customizable product with one or more annotations is displayed. Each annotation of the one or more annotations identifies an attribute group location upon the customizable product that represents an attribute group comprising one or more attributes of the customizable product that may be customized. A selection of a particular attribute group location of the attribute group location identified by the one or more annotations is received. The particular attribute group location represents a particular attribute group. In response to receiving the selection, information relating to one or more attributes included in the particular attribute group is displayed. An attribute selection shape comprising a plurality of regions, each of which represent an attribute of the particular attribute group may be displayed.

16 Claims, 22 Drawing Sheets

Related U.S. Application Data

(60) Provisional application No. 61/839,849, filed on Jun. 26, 2013.

(51) Int. Cl.
| | | |
|---|---|---|
| *G06F 17/24* | (2006.01) | |
| *G06F 3/0484* | (2013.01) | |
| *G06F 17/30* | (2006.01) | |
| *G06T 11/60* | (2006.01) | |
| *G06F 3/0482* | (2013.01) | |

(52) U.S. Cl.
CPC ...... *G06F 17/241* (2013.01); *G06F 17/30896* (2013.01); *G06Q 30/0643* (2013.01); *G06T 11/60* (2013.01)

(56) References Cited

U.S. PATENT DOCUMENTS

| | | | |
|---|---|---|---|
| 8,538,832 B2* | 9/2013 | Brownell | G06Q 30/0603 705/26.5 |
| 2004/0044785 A1 | 3/2004 | Bell et al. | |
| 2004/0212617 A1 | 10/2004 | Fitzmaurice | |
| 2005/0071242 A1* | 3/2005 | Allen | G06Q 10/087 705/26.5 |
| 2005/0102199 A1* | 5/2005 | Lee | G06O 30/06 705/26.5 |
| 2005/0131571 A1* | 6/2005 | Costin | G06Q 30/02 700/132 |
| 2008/0244454 A1 | 10/2008 | Shibaike | |
| 2010/0036753 A1 | 2/2010 | Harvill et al. | |
| 2010/0100834 A1 | 4/2010 | Maconald | |
| 2010/0318442 A1 | 12/2010 | Paul et al. | |
| 2011/0018895 A1 | 1/2011 | Buzyn et al. | |
| 2012/0218468 A1 | 8/2012 | Tan et al. | |
| 2012/0221428 A1 | 8/2012 | Harvill | |
| 2013/0024795 A1* | 1/2013 | Robotham | G06F 3/0486 715/769 |

OTHER PUBLICATIONS

U.S. Appl. No. 14/316,623, filed Jun. 26, 2014, Office Action, dated Feb. 9, 2015.

U.S. Appl. No. 14/316,623, filed Jun. 26, 2014, Notice of Allowance, dated Mar. 30, 2016.

U.S. Appl. No. 14/316,623, filed Jun. 26, 2014, Final Office Action, dated Jul. 23, 2015.

UXMWN:, "MyOwnBike.de" dated Sep. 11, 2012, www.Http://vimeo.com/49234243, retrieved on Oct. 14, 2014, 1 page.

Myownbike.de—individual singlespeed and fixie bikes. Dated Feb. 21, 2012, www.behance.net/gallery/3197765/myownbike-individual-singlespeed-fixie-bikes.

Evlioglu, S. Mass Customization in Footware Industry: Setting up a Web-Based Configurator. Politencico Di Milano. Dated Dec. 20, 2012.

European Patent Office, "Search Report" in application No. PCT/US2014/044459, dated Oct. 24, 2014, 11 pages.

Current Claims in application No. PCT/US2014/044459, dated Oct. 24, 2014, 10 pages.

* cited by examiner

FIG. 15

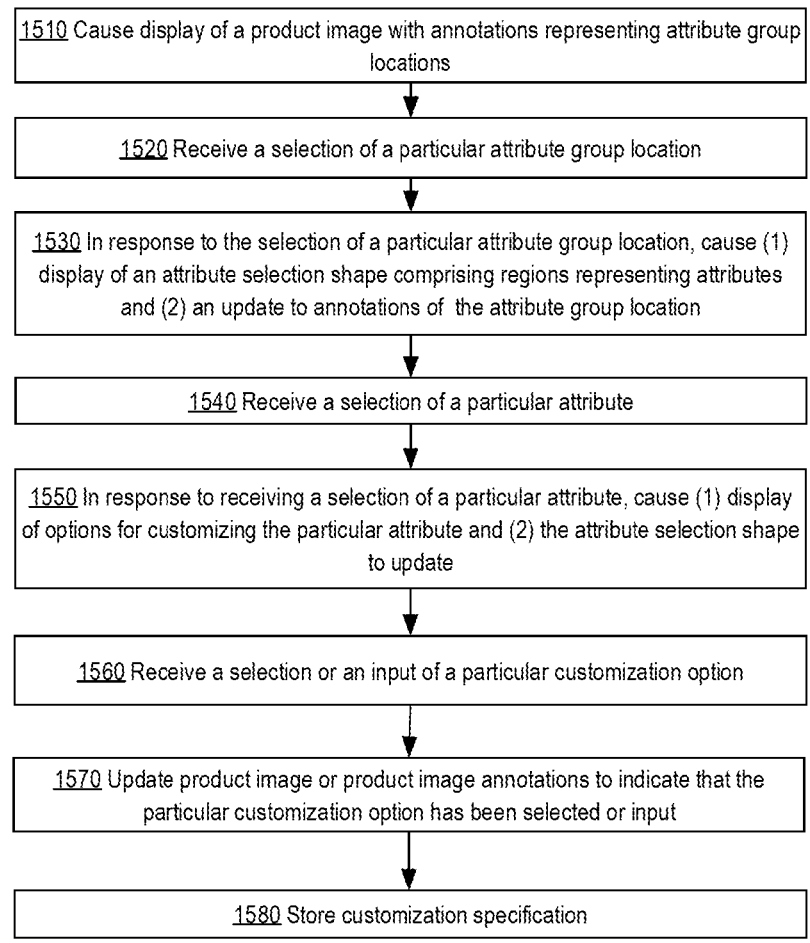

1510 Cause display of a product image with annotations representing attribute group locations 1520 Receive a selection of a particular attribute group location 1530 In response to the selection of a particular attribute group location, cause (1) display of an attribute selection shape comprising regions representing attributes and (2) an update to annotations of the attribute group location 1540 Receive a selection of a particular attribute 1550 In response to receiving a selection of a particular attribute, cause (1) display of options for customizing the particular attribute and (2) the attribute selection shape to update 1560 Receive a selection or an input of a particular customization option 1570 Update product image or product image annotations to indicate that the particular customization option has been selected or input 1580 Store customization specification

DRIVING COMPUTER DISPLAYS WITH CUSTOMIZATION OPTIONS AND COLLECTING CUSTOMIZATION SPECIFICATIONS

BENEFIT CLAIM

This application claims the benefit under 35 U.S.C. § 119 as a continuation of U.S. application Ser. No. 14/316,623, filed Jun. 26, 2014, which claims the benefit of provisional application 61/839,849, filed Jun. 26, 2013, the entire contents of the aforementioned applications are hereby incorporated by reference herein for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The disclosure generally relates to computer systems configured to accept orders, via a service provider, products that are custom manufactured on demand by a third party maker and to drive computer display devices to generate graphical displays with particular customization options and specifications. The disclosure relates more specifically to graphical user interface technology for driving computer display units or portions thereof that are useful in specifying custom manufactured products.

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Customized goods are a highly appealing option for customers that have particular product requirements or customers that desire unique products. Many different attributes of an item may be customized such as shape, color, texture, style, or flavor. The particular attributes which are customizable may vary depending on the product.

Such customized goods may be viewed and purchased through a graphical user displayed at a customer's computer system, such as an interface displayed by a web browser. In many cases, a customizable good may have a large number of attributes that may be customized.

Traditional methods of identifying different varieties of goods that are on sale by a particular seller include displaying a heading for each attribute of the good, such as color or size, and a set of swatches representing the different options for the attribute under the heading of the attribute (e.g., color swatches for different colors) or a drop-down box listing the different options (e.g., a drop-down box listing different size options).

However, customizable goods often have a large number of attributes that may be customized. Traditional approaches of listing attributes and swatches may be unappealing or cumbersome for the large number of attributes that may be customized. Both the seller and the customer would benefit from a graphical interface that identifies the many attributes of a customizable attribute that may be customized and the various customization options for each of the attributes, while still providing the customer with an enjoyable and effortless shopping experience. Thus, there is a need for improved computer systems that are configured to drive the generation of graphical user interface displays in a more efficient and concise manner to obtain selections and configure products.

BRIEF DESCRIPTION OF THE DRAWINGS

In the drawings:

FIG. 15 illustrates an example process for displaying customization options and receiving customization option selections and customization inputs.

SUMMARY

Figure 1:
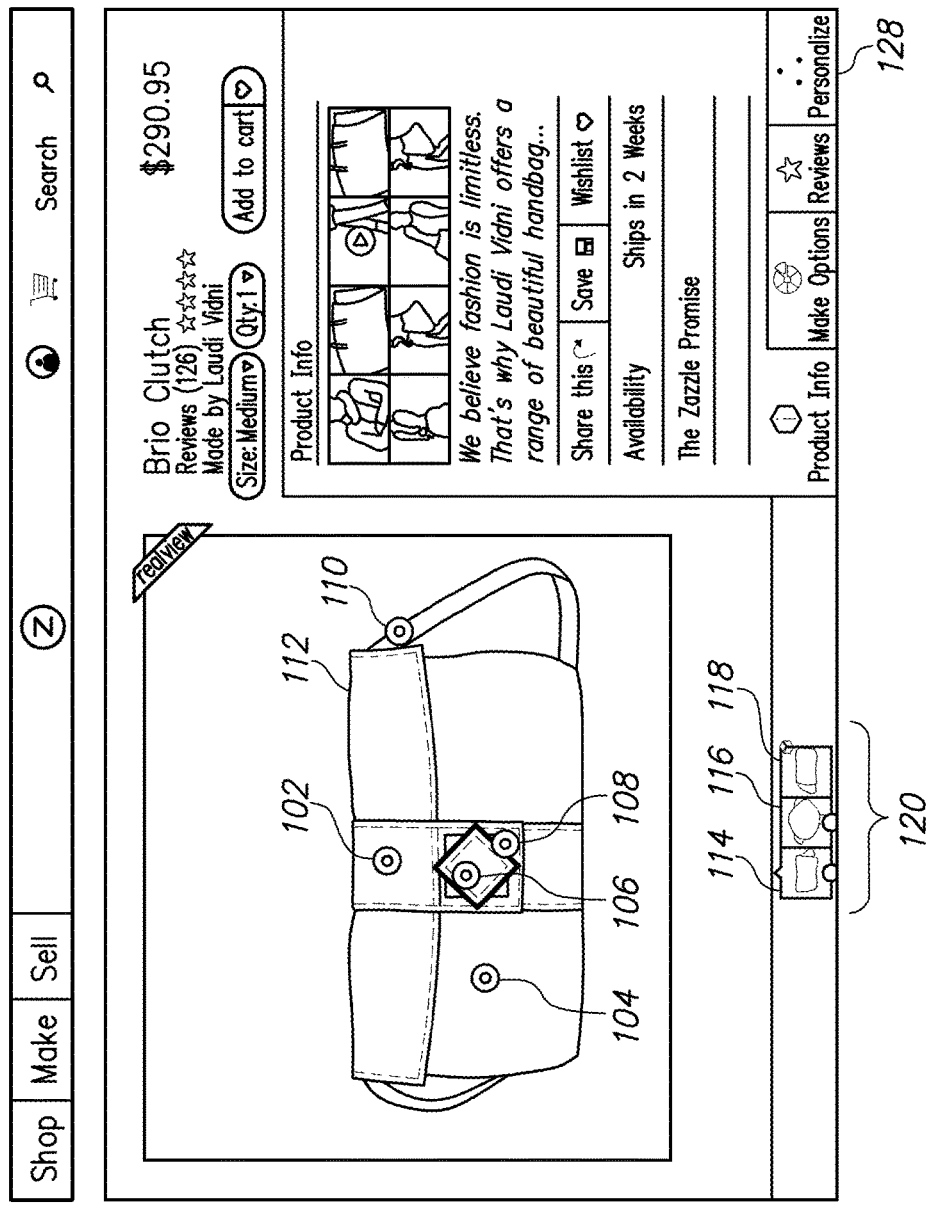
FIG. 1 illustrates an example graphical user interface which displays a product image with overlaid annotations or "hotspots" that represent attribute group locations.

The appended claims may serve as a summary of the invention.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1. General Overview
2. Structural and Functional Overview
   2.1 Annotation of Attribute Group Locations Upon a Product Image
   2.2 Selection of an Attribute Group
   2.3 Selection of an Attribute
   2.4 Selection of a Customization Option
   2.5 Updating Product Image
   2.6 Design Areas
   2.7 Guided Discovery of Customizable Attributes
   2.8 Additional Graphical User Interfaces for the Specification of Customization Option Selections
   2.9 Onboarding of Customizable Product Options
3. Implementation Mechanisms—Hardware Overview

1. General Overview

Techniques for driving computer display devices to improve efficiency and organization in displaying customization options and collecting customization specifications are described. In general, the techniques herein provide improved computer-implemented technology for more efficiently and easily specifying options or attributes for custom manufactured products. For example, in one embodiment, the techniques may be implemented in specially configured logic within an application server computer of a service provider who supports a service for viewing, customizing, ordering and obtaining custom manufactured products. The products may be manufactured or otherwise created by one of a plurality of third party manufacturers or "makers" of the products. The maker may also ship the product or provide the product for pickup. The products may be viewed, customized, ordered and received (or picked up) by an account or a user associated with a client computer that is coupled through networks to the application server computer.

The computer may drive computer-implemented graphical interfaces as described herein in an arrangement to specify customizations for a particular customizable item. The term customer is used herein merely for convenience and refers to any computer, account, or user who interacts with the graphical interfaces, and the user need not have a customer or commercial relationship with a system that implements the graphical interfaces or techniques herein. Moreover, references to user action are stated solely for clarity and convenience, and any such action may comprise computer action. The customizable item may be any of a wide variety of items including but not limited to clothing, toys, apparel, food, and furniture. Using the graphical interfaces, a customer may select customization options and/or input customizations options. The customer selections and/or input may comprise options selected from a list of displayed options, such as a color for a component of the customizable item, or may be a custom input, such as text or an image to be imprinted upon the customizable item. A customer specification comprising the set of customer-specified option selections and input may be stored and used to make the customized product.

The item being customized may possess numerous attributes and each attribute may be customizable in numerous different ways. Examples of attributes include physical product features; for example, in the case of a bag the attributes may include exterior surface, interior lining, strap, handle, etc., and the ways to customize such attributes may include fabric or material, color, piping, etc. It will be apparent from the description herein that even a single product may have ten (10) or more attributes capable of customization, and ten (10) or more ways of customizing each of the attributes. Other approaches for displaying customization options, such as displaying a drop down menus for each customizable attribute, may be cumbersome due to the number of possible attributes and ways of customizing, and/or uninteresting to a customer. The techniques described herein may comprise displaying graphical interfaces that are streamlined to only display information about a portion of the customizable attributes and/or available customization options at a time. Further customization options or attributes may be displayed in response to a customer selecting particular interface components. The unique display of information and components in the graphical interfaces as described herein provide a customer with an enjoyable and efficient shopping experience. A customer may quickly browse the various available options and specify his or her selections and inputs. Further, the techniques herein may lead to improved customer engagement with the customization and ordering process, and a reduced rate of abandonment of customization operations or orders.

In an embodiment, each of the processes described in connection with the functional units of the drawing figures may be implemented using one or more computer programs, other software elements, and/or digital logic in any of a general-purpose computer or a special-purpose computer, while performing data retrieval, transformation and storage operations that involve interacting with and transforming the physical state of memory of the computer. The disclosure herein is directed to computer implementations and specific applications of the processes, functions and functional units that may be more generally described herein, and the disclosure is not intended to preempt the use of other practical implementations of the processes and functions herein using means other than computers.

2. Structural and Functional Overview

Figure 14:
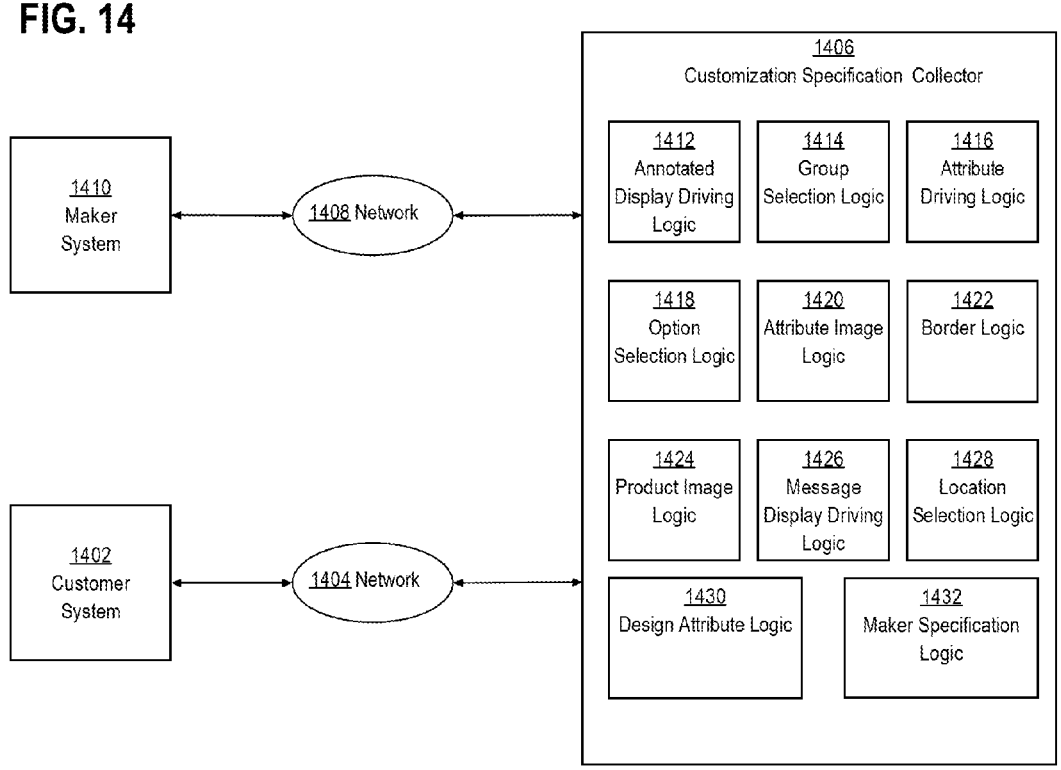
FIG. 14 illustrates an example computer system that may be used to implement processes for displaying customization options and receiving customization option selections and customization inputs.

FIG. 14 illustrates an example computer system that may be used to implement processes for displaying customization options and receiving customization option selections and customization inputs. Graphical interfaces for collecting customization specifications may be displayed at customer system 1402 and a customer may provide a customization specification by interacting with customer system 1402. Customer system 1402 may be a smartphone, tablet computer, a portable computing device, a television, a wearable computing device, or a personal computer and may comprise an electronic display such as a screen or monitor on which graphical interfaces are rendered and/or displayed. A customer may provide selections or input by, for example, interacting with a display screen of customer system 1402, a mouse, a trackball, or cursor direction keys. For example, the customer may interact with the display screen via touch or gestures.

Customer system 1402 is coupled directly or indirectly through one or more networks 1404 to customization specification collector 1406. Customer system 1402 may comprise instructions for automatically generating particular graphical interfaces in response to particular user requests, selections, or input. Customization specification collector 1406 may be operated by a retailer of a customizable product and may comprise one or more general-purpose programmed computers, special-purpose computers, and/or computing processes in data centers or cloud service providers that are configured or programmed to perform the functions and techniques that are further described herein. The retailer of the customizable product may sell a variety of customizable products made by a variety of different makers. The retailer may operate an online website, or native interne-enabled applications such as a mobile application, through which customers or other users may place orders for the customizable products and specify the ways in which a product is to be customized.

FIG. 14 illustrates exemplary components of customization specification collector 1406 including: annotated display driving logic 1412 for driving the generation of a graphical user interface display of a product image depicting a customizable product annotated with one or more annotations identifying attribute group locations representing attribute groups; group selection logic 1414 for receiving electronic messages comprising selections of attribute group locations; attribute driving logic 1416 for driving the generation of a graphical user interface display of information relating to one or more attributes of a customizable product; option selection logic 1418 for receiving a selection of a particular option for customizing a particular attribute; attribute image logic 1420 for driving the generation of a graphical user interface display of attribute images depicting options in association with attribute group locations; border logic 1422 for driving the generation of graphical user interface displays of attribute image borders; product image logic 1424 for driving the generation of a graphical user interface displays of product images, including updated product images that may be zoomed in versions of prior product images; message display driving logic 1426 for driving the generation of graphical user interface displays of messages to guide a customer to different attributes that can be customized and/or different available customization options; location selection logic 1428 for receiving electronic messages comprising selections of locations within product images; design attribute logic 1430 for driving the generation of graphical user interface displays in response to the selection of design attributes, including graphical user interface displays that show updated selection shapes and customization options for selected design attributes; maker specification logic 1432 for receiving for receiving specifications from maker systems, such as a specification that identifies the base attribute of a customizable product.

In some embodiments, the customization specification collector is a different entity than the maker which creates the product according to the customer's specifications. In such an embodiment, customization specification collector 1406 may automatically determine customization instructions based on the obtained customization specification and transmits the customization instructions to a system local to a maker.

FIG. 15 illustrates an example process for displaying customization options and receiving customization option selections and customization inputs. The process of FIG. 15 may be performed at customization specification collector 1406. In an embodiment, each of the processes described in connection with the functional blocks of FIG. 15 may be implemented using one or more computer programs, other software elements, and/or digital logic in any of a general-purpose computer or a special-purpose computer, while performing data retrieval, transformation and storage operations that involve interacting with and transforming the physical state of memory of the computer. Thus, FIG. 15 is intended to relate to a particular computer-implemented application of the process described herein.

2.1 Annotation of Attribute Group Locations Upon a Product Image

At block 1510, customization specification collector 1406 causes display of a product image with annotations representing attribute group locations. FIG. 1 illustrates an example graphical user interface which displays a product image 112 with overlaid annotations 102, 104, 106, 108, 110 that represent attribute group locations. For purposes of illustrating clear examples, in FIG. 1 and other views herein, the graphical interface displays a product image of a customizable purse. Various attributes of the purse may be customized according to a customer's selections, such as body color, body leather, sash color, buckle color, handle color, inside lining color, and others. However, in other embodiments, data or images representing any other customizable object or product may be displayed, customized, and otherwise used according to the techniques herein.

The various customizable attributes of a customizable item which may be customized may be grouped into attribute groups. Each attribute group may be associated with an attribute group location within a product image. The attribute group location may be a region or a point within the product image. In an embodiment, the product image comprises location annotations identifying the attribute group locations. For example, the product image of FIG. 1 comprises annotations or "hotspots" in the form of five (5) circular symbols 102, 104, 106, 108, 110; each identifies an attribute group location. In the example of FIG. 1, hotspots are placed on a strap, flap, body, and ornamental items of the product; third party makers or a service provider may determine particular hotspot locations that are convenient or intuitive with respect to a particular part of a product.

The placement of the hotspot 110 on the strap of the purse is arbitrary and the hotspot could appear anywhere on the strap. In other embodiments, the attribute group locations may be emphasized, highlighted, or identified in other ways. For example, arrows pointing to each attribute location may be overlaid upon the product image.

A customer may view multiple product images. The different product images may depict different portions of the product. For example, one product image may depict the front portion of a bag and second product image may depict the inside portion of a bag. Different product images may comprise different location annotations identifying locations that represent different attribute groups.

For example, a product image depicting the inside of the bag may comprise a location annotation representing the lining of the bag, which may not be not visible in any of the other product images associated with a product. Thumbnail images of the different product images, image 114, image 116, and 118 may be displayed in a product image thumbnail tray 120, as illustrated in FIG. 1.

In an embodiment, the attribute group includes all attributes related to a particular physical component of the customizable product, and the attribute group location may be positioned at a location within the product image which depicts the physical component. For example the circular symbol 110 upon the strap of the bag may identify an attribute group location corresponding to an attribute group that is comprised of attributes relating to the strap of the bag, such as strap color, strap length, and others.

Figure 2:
FIG. 2 illustrates an example graphical user interface which may be displayed when a customer interacts with a particular attribute group location.

In an embodiment, in response to detecting input indicating a customer expression of interest in a particular attribute group, such as data indicating a customer causing a cursor or a finger to hover over the attribute group location, information about the attribute group is displayed. In another embodiment, the attribute group locating information may be displayed in response to a particular customer gesture such as swiping over a particular attribute group location. For example, FIG. 2 illustrates an example graphical user interface which may be displayed when a customer interacts with a particular attribute group location. For example, the customer may cause a cursor to hover over a particular attribute group location or may perform a gesture over the location where the particular attribute group location is displayed.

The particular attribute group location is emphasized, for example by animating or changing the color of the annotation corresponding to the attribute. Additionally, as depicted in FIG. 2, in response to the customer expression of interest in the attribute group location, a title corresponding to the attribute group may be displayed. Additionally, an appearance of hotspot 204 changes color and a title 202 of Sash is displayed with the hotspot in response to the selection. In other embodiments, other information relating to the attribute group may be displayed, such as a list of the attributes that belong to the attribute group. In other embodiments, title and other attribute group information may be displayed for all the attribute groups even prior to any customer expression of interest.

2.2 Selection of an Attribute Group

At block 1520, customization specification collector 1406 receives a selection of a particular attribute group location. The customer may select the particular attribute group by, for example, tapping or clicking on the attribute group location within the product image or by tapping or clicking on an annotation of the attribute group location. In some embodiments, the attribute group may be selected from a list of attribute groups displayed separate from the product image. For example, the "Make Options" component 124 displayed in the graphical user interface illustrated in FIG. 1 may cause a list of selectable attribute groups, attributes, and/or options to display when selected. The annotation of the attribute group location may be, for example, the circular symbol displayed upon the attribute group location (e.g., symbol 102) or a title of the attribute group location (e.g., title 202). The annotation may display in response to a customer interaction with the attribute group location, such as a customer causing a cursor to hover over or near the attribute group location or a customer performing a gesture over or near the location where the attribute group location is displayed.

At block 1530, in response to the selection of a particular attribute group location, customization specification collector 1406 causes (1) display of an attribute selection shape comprising regions representing attributes and (2) an update to annotations of the attribute group location. In an embodiment, no attribute selection shape is displayed until a particular attribute group location is selected. In another embodiment, a particular attribute group may be selected by default and the attribute selection region representing the particular attribute group may display by default.

Figure 3:
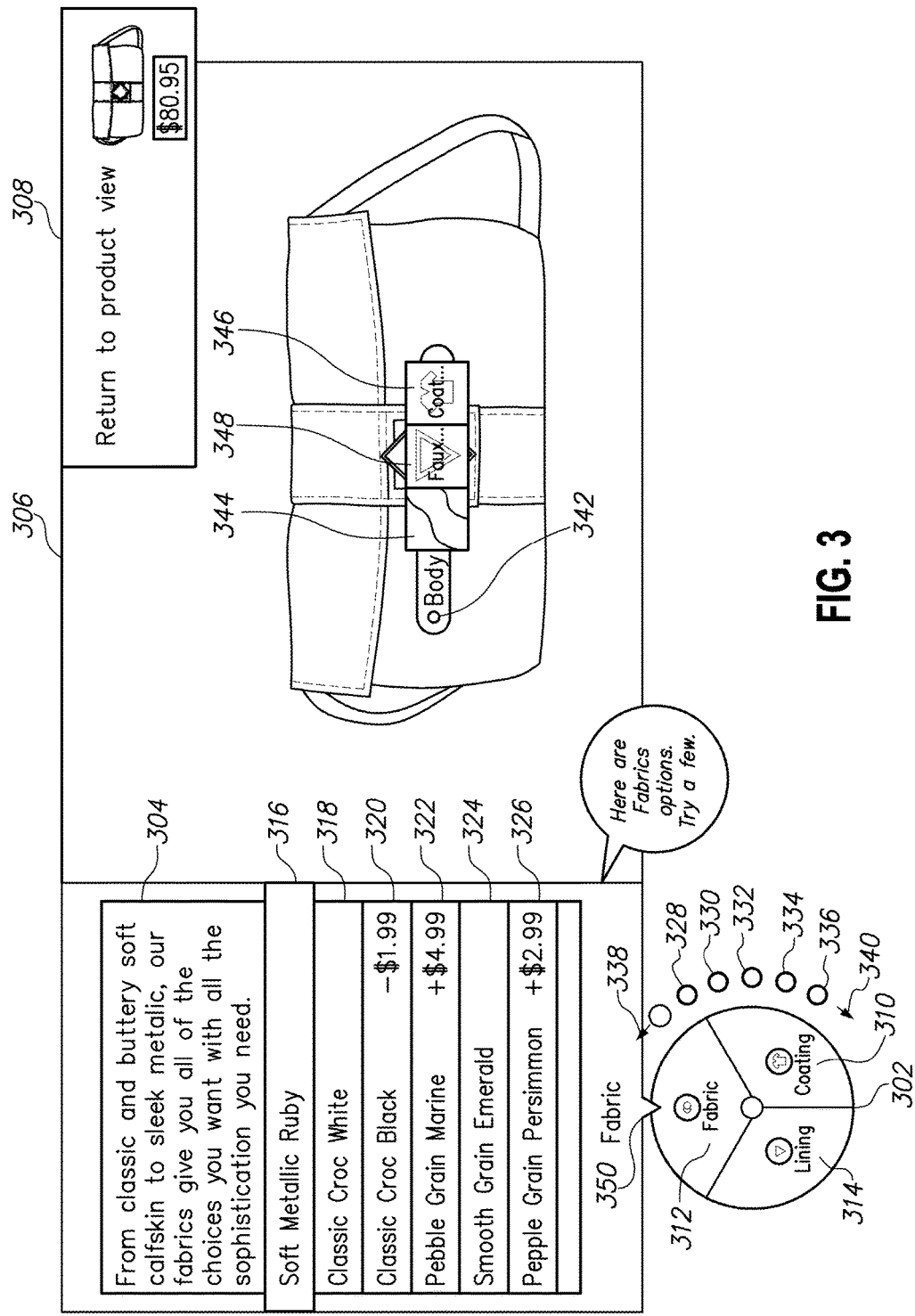
FIG. 3 illustrates an example graphical user interface comprising an example attribute selection shape and option pane which may be displayed when a customer selects an example attribute group location.

FIG. 3 illustrates an example graphical user interface comprising an example attribute selection shape and option pane which may display when a customer selects an example attribute group location. In an embodiment, customization specification collector 1406 causes the example graphical interface of FIG. 3 to display automatically in response to receiving data indicating a selection of the attribute group location 342 representing the attribute group of Body. An interface having the general form of FIG. 3 also display in response to user input selecting any other attribute group location.

In an embodiment, the graphical interface of FIG. 3 comprises a product view pane 306 in a center of the display screen, a Return to Product View control 308 in an upper right portion of the display screen, an attribute selection shape 302 in a left portion of the display screen, and an option pane 304 located adjacent or near to the attribute selection shape 302.

In an embodiment, an option pane 304 does not appear until a particular attribute is selected. In another embodiment, in response to a selection of a particular attribute group, an option pane including options for a default attribute appears in addition to the attribute selection shape.

Portions of the attribute selection shape may each represent a particular attribute belonging to the currently selected attribute group. For example, attribute selection shape 302 an attribute selection circle that functions in some respects as a radial control. In the example of FIG. 3, the circle is partitioned into three equal-sized regions, 312, 312, and 310, each of which represents a particular customizable attribute belonging to the attribute group of Body, namely Fabric, Lining, Coating. In other embodiments, the shape may be any other shape including, but not limited to, a square, a rectangle, or a hexagon.

The size of the regions in the attribute selection shape may depend on how many regions are displayed within the attribute selection shape. For example, if there are five regions, the attribute selection shape 302 may be partitioned into five regions, and each region may be smaller than the region sizes depicted in FIG. 3. The region may be associated with a maximum size. For example, even if an attribute group only comprises a single attribute, the region may not be larger than the maximum size. Regions may be equal in size, or different in size.

The attribute selection shape may also be associated with a maximum region amount or count. If the number of attributes that belong to the attribute group represented by the attribute selection shape is greater than the maximum region amount, regions representing only some of the attributes belonging to the attribute group may be displayed at a given time, with an indication suggesting to the user that manipulation of the attribute selection shape, such as rotation, will cause visibility of the other attributes, as further described herein for FIG. 4. If the number of attributes that belong to the attribute group represented by the attribute selection shape is less than the maximum region amount, regions representing each of the attributes belonging to the attribute group may be displayed at a given time.

The regions may be annotated with information identifying the particular attribute they represent. For example, as depicted in FIG. 3, regions of the attribute selection shape are annotated with the title of the corresponding attribute and an icon representing the corresponding attribute. For example, the region 310 representing coating is annotated with the word Coating and an icon representing Coating. In another embodiment, the information may be displayed near the regions outside the attribute selection shape.

The option pane may display information about various selectable options associated with the currently selected attribute of the currently selected attribute group or the default attribute of the currently selected attribute group. For example, option pane 304 includes an option image for each customization option that may be selected for the Fabric attribute, including option image 316, 318, 320, 322, 324, and 326. Each option image may represent a different type of fabric which may be used for the body of the purse. If no attribute has been selected, the option pane may display information about a default attribute of the attribute group.

In some embodiments, only a limited amount of option information is displayed within an option pane at a time. For example, the option pane may only be large enough to accommodate five (5) option images for a particular attribute even though the particular attribute may correspond to ten (10) different customization options. In some embodiments, a user may cause different information to display within the option pane by selecting an interface component for causing scrolling of the option information.

An option may be associated with additional information that is displayed when a customer expresses interest in the option, for example by causing a cursor to hover over the corresponding option image, or selecting the option, such as by clicking on the option image. In other embodiments, the customer may interact with the option image via touch such as by tapping on the option image.

The additional information may be text, such as a text description by the maker or a user reviews from other customers, or media, such as videos or images containing information about the option. In some cases, the additional information may comprise a link to view the media or a media play controls.

In an embodiment, selecting the Return to Product View control 308 of FIG. 3 causes the collector 1406 and/or client system 1402 to update the display to remove the attribute selection shape 302, options pane 304, and "Return to Product View" control 308 and to display a view of the type shown in FIG. 1, FIG. 2.

Figure 5:
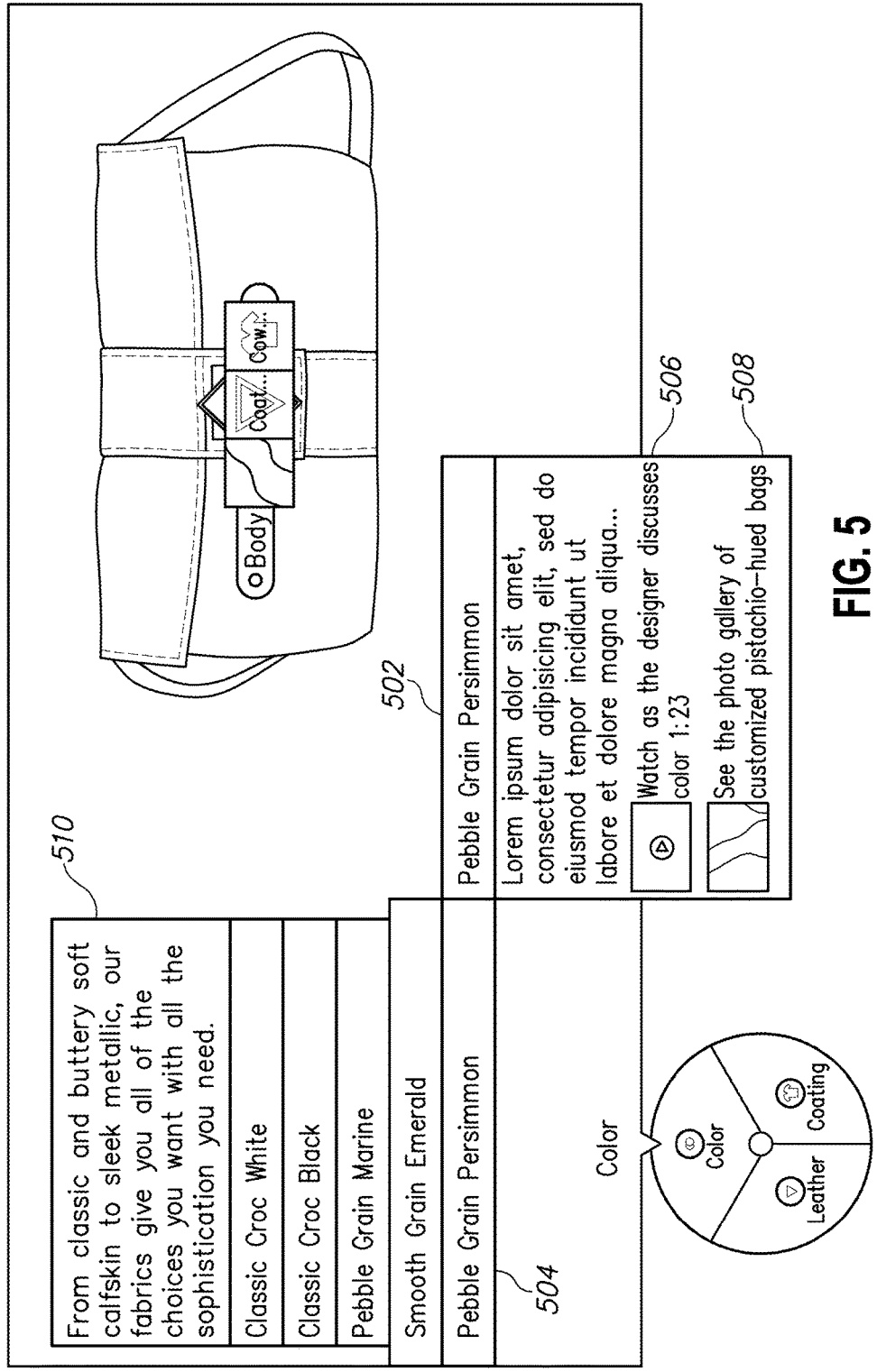
FIG. 5 illustrates an example graphical user interface that may be displayed when a customer interacts with an interface component associated with the display of additional information about a particular customization option.

FIG. 5 depicts an example graphical user interface that may be displayed when a customer interacts with an interface component associated with the display of additional information about a particular customization option. For example, the customer may cause a cursor to hover over the interface component or may perform a gesture over the location where the interface component is displayed.

Option pane 510 includes a plurality of option images that each depict a customization option for the Color attribute. A customer may cause further information about the Pebble Grain Persimmon customization option for the Color attribute to display in a "fly-out" pane 502 by hovering over, or clicking or tapping on, the upper right corner of the option image 504 for the Pebble Grain Persimmon customization option. The further information may comprise a link 506 to watch a video of the designer discussing this color or a link 508 to a photo gallery of different bags customized with the Pebble Grain Persimmon color. In some embodiments, when the fly-out pane appears, the pane may not cause the distance between the product image and the attribute selection shape to expand; a portion of the fly-out pane may simply be overlaid upon a portion of the product image.

In an embodiment, in response to the selection of a particular attribute group, an option pane 510 displaying options for the default attribute of the particular attribute group automatically displays. In another embodiment, option pane 510 is only displays after a particular attribute of the attribute group is selected.

In response to a customer selection of a particular attribute group that is different than the currently selected attribute group or if no attribute group was previously selected, the product image may be replaced by a zoomed in product image that is zoomed in on the attribute group location corresponding to the selected attribute group. Other attribute group locations that were visible in the previously displayed product image may no longer be displayed in the zoomed in product image. The attribute images of the newly selected attribute may appear.

In some embodiments, not all regions corresponding to attributes belonging to the currently selected attribute group are displayed within the attribute selection shape at the same time. For example, a particular attribute group may comprise seven different attributes and an attribute selection circle may only be partitioned into three regions. The graphical interface may display components, which when selected cause additional regions to display.

Figure 4:
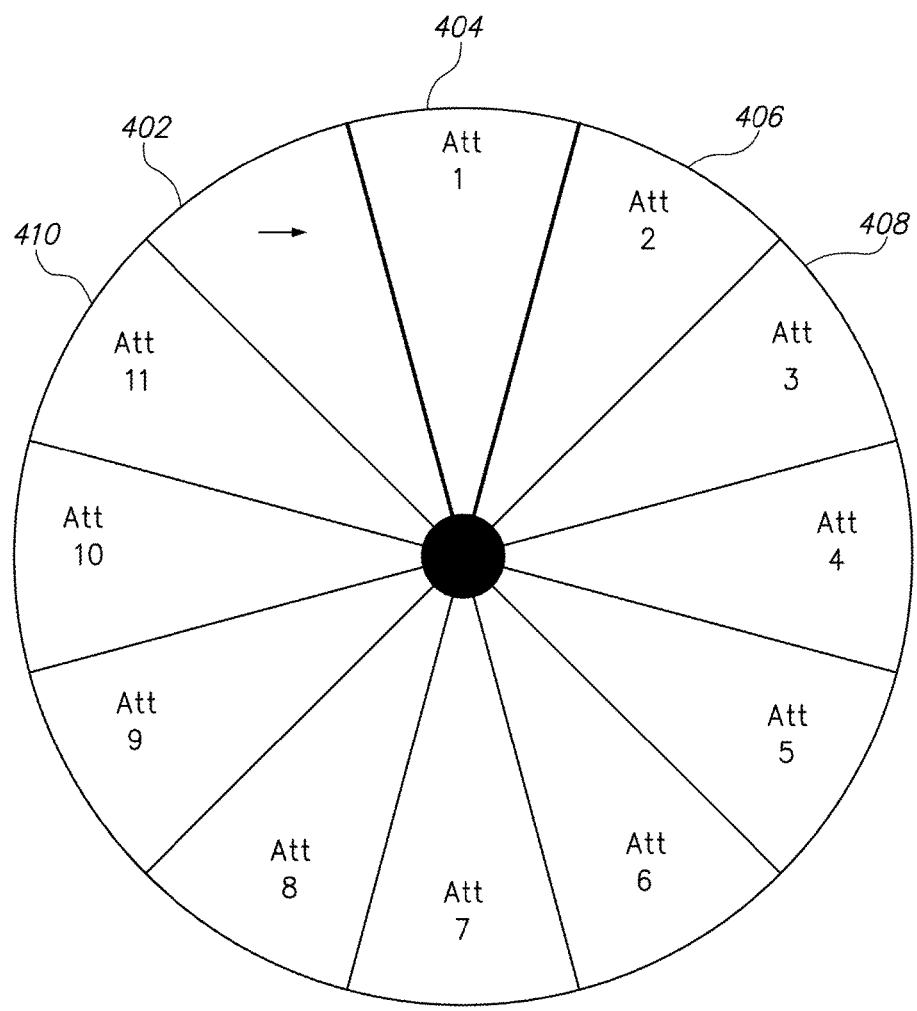
FIG. 4 illustrates an example attribute selection circle, where a portion of the circle is a region advancement area, which contains components for controlling the rotation of the wheel so that additional regions may display.

For example, FIG. 4 illustrates an example attribute selection circle which is partitioned into twelve regions. Region 402 is a region advancement area containing a rightward-pointing arrow. Each of the other regions represents a particular attribute. When the region advancement area is selected, additional regions representing other attributes may display. In an embodiment, when the region advancement area is selected while the attribute selection circle is in the configuration depicted in FIG. 4, the regions representing attributes 1-10 may shift one region clockwise. For example, the attribute selection circle may update such that "Att 1" region 404 is rotated to the location of the "Att 2" region" 406, the "Att 2" region is rotated to the location of the "Att 3" region 408, and so forth. A new region may be displayed at the prior location of the "Att 1" region and the "Att 11" region 410 may no longer be visible.

In another embodiment, a customer may cause new regions to be displayed by selecting and dragging a portion of the attribute selection circle. The circle may rotate in the direction of the dragging and a new region may be displayed. Additionally, a new region may display which was not previously visible in response to a customer selecting an attribute selection region different than the currently selected region.

In response to a customer selecting an attribute group different than the currently selected attribute group, the attribute selection shape may update by displaying regions representing attributes belonging to the newly-selected attribute group instead of regions representing attributes belonging to the previously-selected attribute group.

In an embodiment, attribute group selection components are also displayed separate from the product image. For example, the circular symbols 328, 330, 332, 334, 336 to the right of the attribute selection circle in FIG. 3 may each represent a particular attribute group and a new attribute group may be selected by selecting the circular symbol corresponding to the new attribute group. In some embodiments, components for selecting attribute group locations separate from the product image, such as the circular symbols, are only displayed after a particular attribute group location of the product image has already been selected, such as attribute group location 342. In some embodiments, selecting an attribute group selection component has at least the same effect as selecting an attribute group location of the product image or an annotation thereof. For example, a customer selection of an attribute group selection component may cause the attribute selection shape to update to display the regions of the newly selected attribute group.

Components representing only a portion of the attribute groups may be displayed at a given time. Additional components representing other attribute groups may display in response to a customer selecting a particular component associated with the advancement of attribute selection components. For example, the arrow symbols 338 and 340 may be selectable. Upon selection, they may cause at least one new attribute selection components to display, where the at least one new attribute selection component is associated with a different attribute group than any of the previously display attribute selection components.

Figure 6:
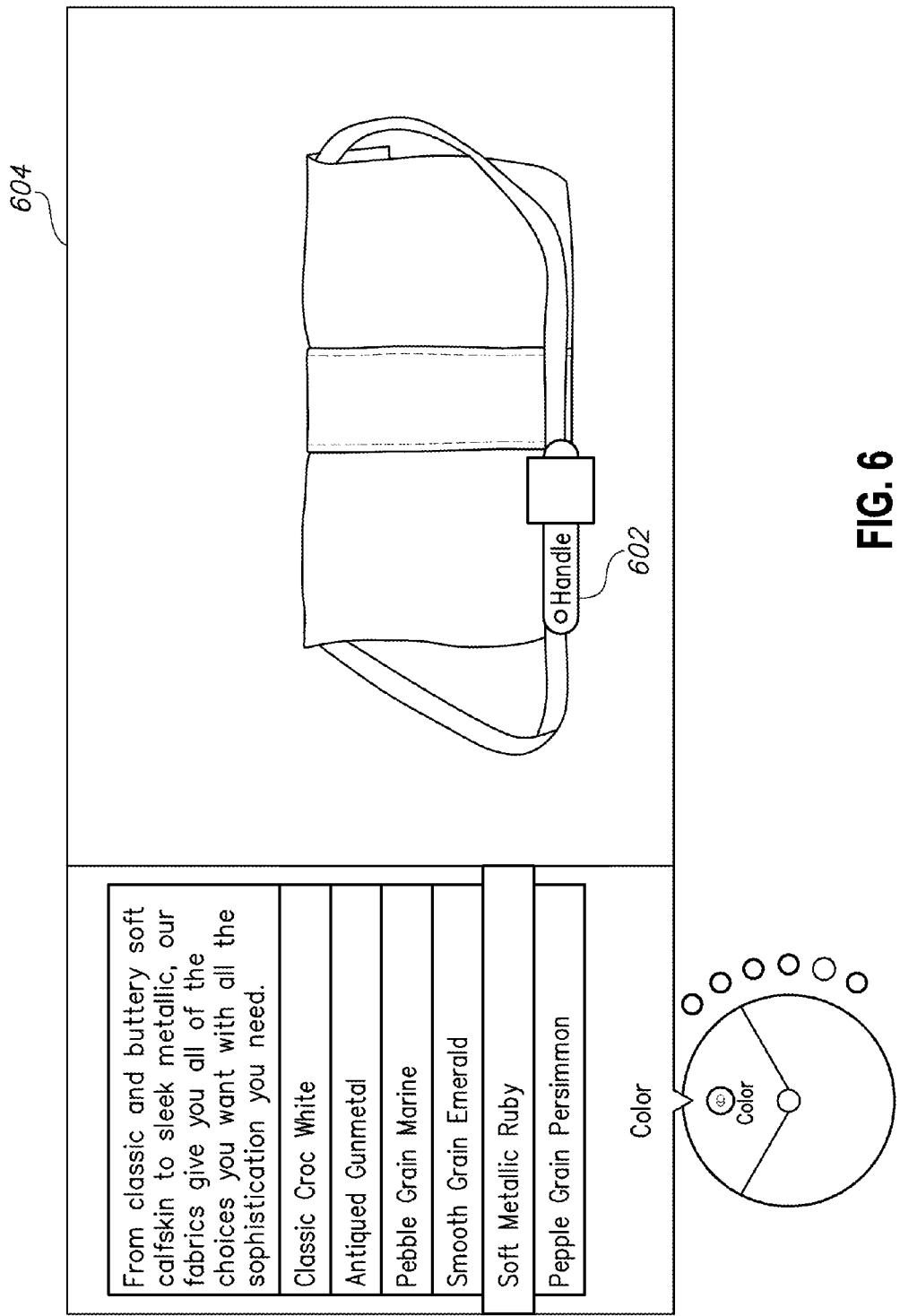
FIG. 6 illustrates an example graphical user interface that may be displayed in response to a customer selecting an attribute group selection component corresponding to an example attribute group.

In an embodiment, selecting a particular attribute group selection component may cause the displayed product image 306 to change to a different product image which depicts a different portion of the product. In an embodiment, each attribute group is associated with a particular portion of the product. In response to a particular attribute group being selected, if the currently displayed product image does not depict the portion associated with the particular attribute group, the product image may change to a different product image which depicts the associated portion. The different portion of the product may only be visible from a different angle. For example, FIG. 3 may be a graphical interface displayed before a selection of a different attribute group and the graphical interface of FIG. 6 may be displayed in response to a customer selecting the attribute group selection component corresponding to the Handle attribute group (e.g., 334). The Handle attribute group may be associated with the back portion of the product. Thus, in response to the customer selecting the attribute group selection component corresponding to the Handle attribute group, the product image displayed in FIG. 6, which depicts the back portion of the product, may display.

Figure 13:
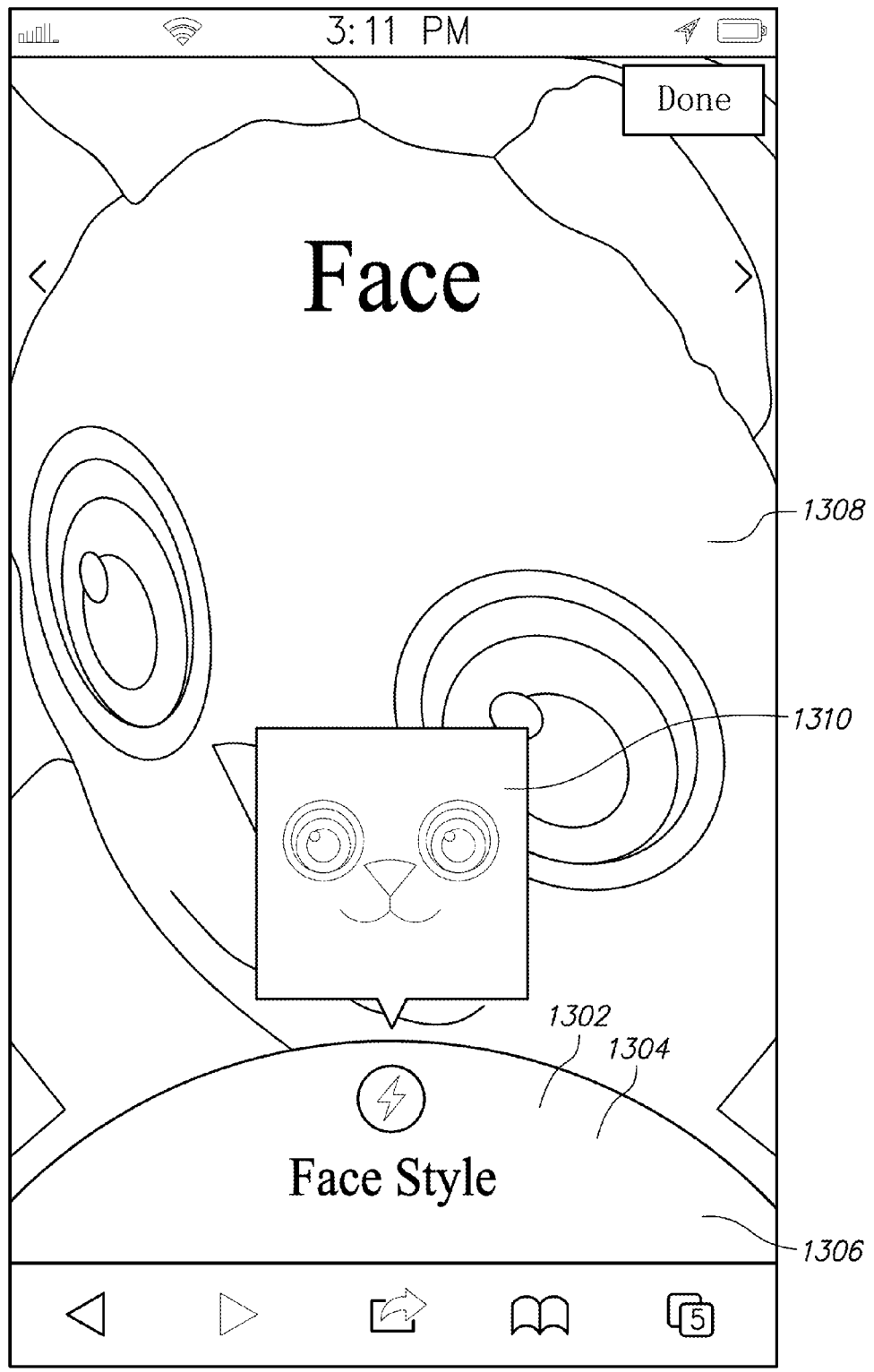
FIG. 13 illustrates an example graphical interface where at least a portion of the attribute selection shape is not visible.

In an embodiment, only a portion of the attribute selection shape is visible at a time, and the portion includes a single region or a different number of regions that is less than the entire amount of attributes that belong to the attribute group represented by the attribute selection shape. FIG. 13 illustrates an example graphical interface where at least a portion of the attribute selection shape is not visible. Such an interface may be displayed upon detecting that the customer is utilizing a device with a small-sized display screen, such as a mobile device. The attribute selection circle 1302 depicted in FIG. 13 may represent attributes relating to the face of a stuffed animal toy and belonging to the Face attribute group. Only a portion of the attribute selection circle may be visible at any given time, and the portion may include a single region 1304 representing the currently selected attribute.

Other attributes of the Face attribute group may be displayed in response to a customer selecting and dragging a portion of the attribute selection circle. The circle may rotate in the direction of the dragging and a new region may be displayed. A different region may also be displayed in response to a customer selecting a portion of the attribute selection circle that does not represent the currently selected region. For example, selecting the partially visible region 1306 to the right of the Face Style region 1304 may cause the attribute corresponding to the partially visible region 1306 to be the currently selected attribute. The selection may cause the attribute selection circle 1302 to rotate counter-clockwise to fully display the newly selected region 1306.

Customization specification collector 1406 may also cause an update to one or more annotations of an attribute group location in response to the attribute group location being selected. The attribute group location of the product image may be annotated with attribute images that each represents an attribute belonging to the attribute group. For example, FIG. 3 illustrates an example graphical user interface that is displayed when a customer selects an example attribute group location. The selected attribute group location may be the attribute group location 342 corresponding to the Body attribute group. As depicted in FIG. 3, the attribute group location 342 representing the Body attribute group is annotated with three attribute images including an attribute image 344 representing the attribute Fabric, an attribute image 346 representing the attribute Coating, an attribute image 348 representing the attribute Lining. An attribute image may depict a corresponding attribute that is represented by the attribute group location and may be overlaid upon at least a portion of the product image near the attribute group location. The attribute image may depict a default option or a selected option for the corresponding attribute. For example, the first attribute image 344 corresponding to the Body attribute group may depict the default customization option, Soft Metallic Ruby for the Fabric attribute.

In an embodiment, only the annotations of the currently selected attribute group are displayed. For example, as depicted in FIG. 3, only the circular symbol and attribute images corresponding to the currently selected attribute group of Body are displayed upon the product image. The other attribute group locations are not annotated in any way.

The attribute images representing the attributes of a corresponding attribute group (e.g., images 344, 346, 348) may only display in response to the selection of the attribute group. An attribute group may be selected by selecting the corresponding attribute group location (e.g., attribute group location 342). In another embodiment, the currently selected attribute group may additionally or instead be identified in some other way or by some other type of annotations. For example, the color of the circular symbol identifying the attribute group location may change or the circular symbols identifying other attribute group locations may be removed from the product image.

2.3 Selection of an Attribute

At block 1540, customization specification collector 1406 receives a selection of a particular attribute. A customer may select a particular attribute for customization by selecting a region of the attribute selection shape that represents the particular attribute (e.g., region 312). Selecting a region may comprise tapping or clicking on a location within the region. In other embodiments, an attribute group may comprise only a single attribute. In such an embodiment, a customer may select a particular attribute by selecting the attribute group location corresponding to the particular attribute.

An updated product image, which is a zoomed in version of the product image, may display in place of the prior product image in response to the selection of the particular attribute. The updated product image may be zoomed in on the attribute group location corresponding to the particular attribute and the region surrounding the particular attribute group location.

Figure 26:
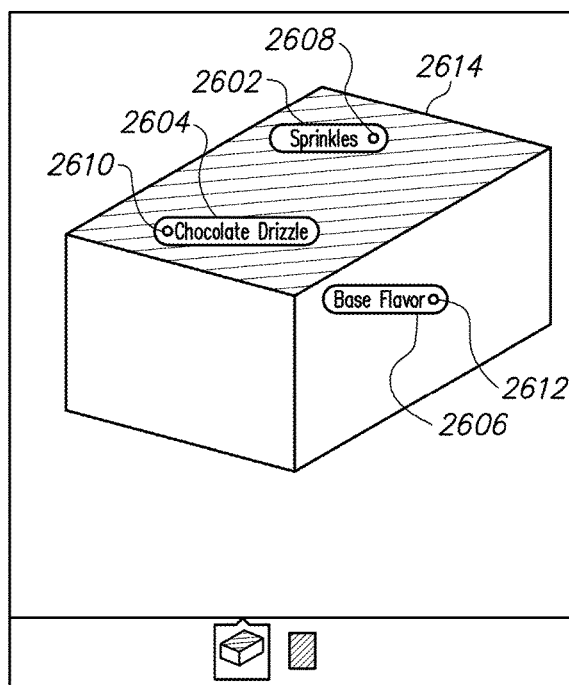
FIG. 26 illustrates an example graphical interface which may display before any customization options are selected or input by a customer device at which the example graphical interface is displayed.
Figure 27:
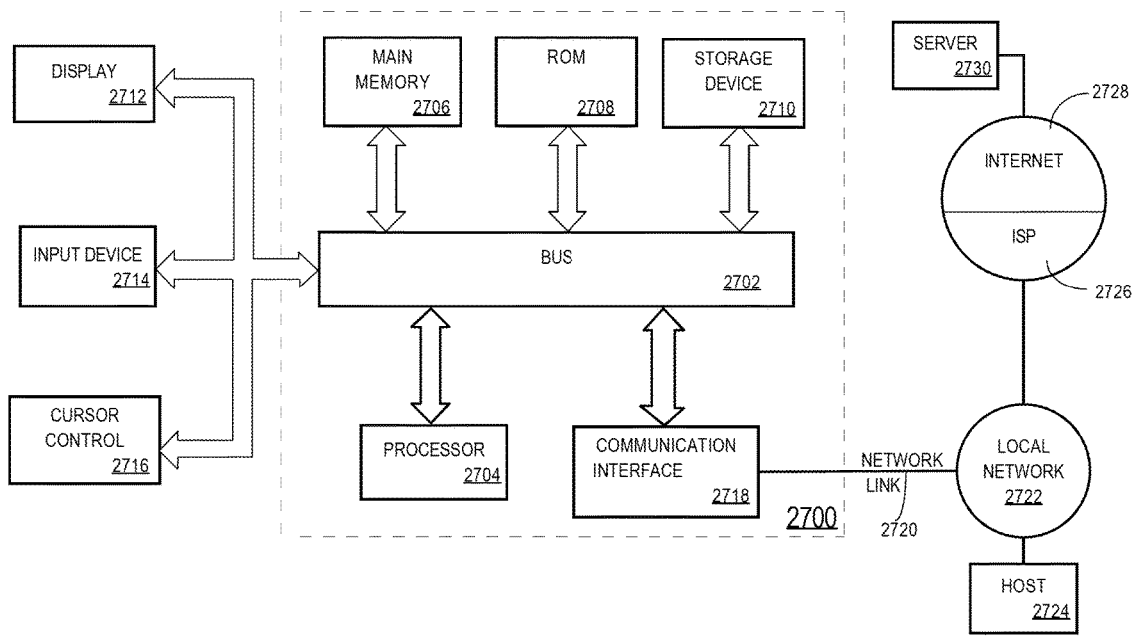
FIG. 27 is a block diagram that illustrates a computer system upon which embodiments of the invention may be implemented.

To illustrate a clear example, FIG. 26 illustrates an example graphical interface which may display at a customer device before any customization options are selected or input by the customer device. Specifically, the graphical interface of FIG. 26 may display when no customization options are selected for the attributes of Sprinkles, Chocolate Drizzle, and Base Flavor. Attribute headings 2602, 2604, 2606 respectively annotate attribute group location 2608, 2610, 2612 in product image 2614. None of the attribute group locations in product image 2614 are annotated with attribute images.

Figure 17:
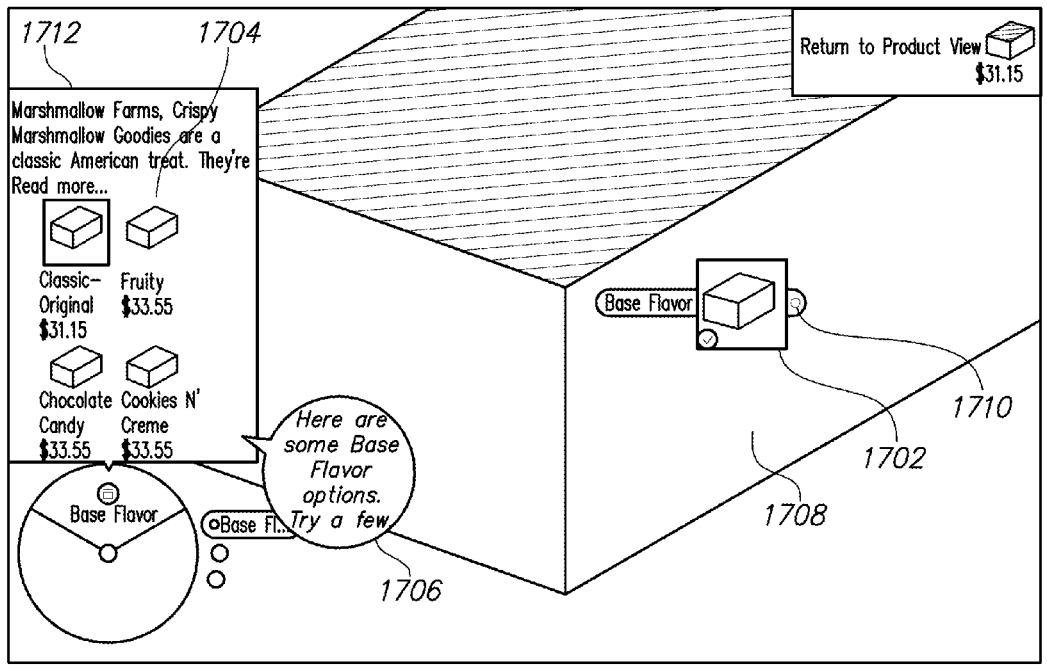
FIG. 17 illustrates an example graphical interface displaying an updated product image that may display in response to the selection of an attribute.

In response to receiving a selection of attribute group location 2612 in FIG. 26, which represents the attribute of Base Flavor, customization specification collector 1406 may display the graphical interface of FIG. 17. FIG. 17 illustrates an example graphical interface displaying an updated product image that may display in response to the selection of an attribute. Product image 1708 is zoomed in version of product image 2614.

Product image 1708 does not depict the entire portion of the customizable item depicted in product image 2614; instead product image 1708 is zoomed in on attribute group location 2612 corresponding to the selected attribute and the region of the customizable product surrounding attribute group location 2612. "Zoomed in" is used herein to indicate that the updated product image depicts an enlarged version of a portion of the product image displayed before the updating. The portion of the product image displayed in the zoomed in image may not be the entire portion of the product image depicted in the product image displayed before the zoomed in product image is displayed.

Attribute image 1702, which depicts the default customizable option of Classic-Original for the attribute of Base Flavor, annotates attribute group location 1710, which represents the attribute of Base Flavor. Additionally, option pane 1712, which identifies the different customization options for the Base Flavor attribute displays.

At block 1550, in response to receiving a selection of a particular attribute, customization specification collector 1406 causes display of options for customizing the particular attribute and the attribute selection shape to update. The particular attribute may be an attribute different from the currently selected attribute or the default attribute if no attribute has been selected yet.

In an embodiment, options for a default attribute are displayed in the option pane and the attribute selection shape identifies a default attribute as the currently selected attribute until the customer selects a different attribute. If another selection of a different attribute is received, the attribute selection shape may update in response to the customer selection of the different attribute to indicate that that the newly selected attribute is the currently selected attribute.

The appearance of the attribute selection shape may indicate which attribute is the currently selected attribute, or if no attribute has been selected, which attribute is the default attribute. In an embodiment, the orientation of the attribute selection shape identifies the currently selected attribute or the default attribute. For example, as depicted in FIG. 3, the attribute selection circle 302 is oriented such that the center of the region 312 corresponding to the currently selected attribute of Fabric is the positioned at the top of the attribute selection circle. The selected region may also, or instead, be identified in other ways.

The background color of the region corresponding to the currently selected attribute, region 312, is darker than the other regions and an arrow 350 from the option pane 304 points to the currently selected region 312. For example, in response to a customer selecting an attribute different than the currently selected attribute, the attribute selection circle 302 depicted in FIG. 3 may update so that the region representing the newly selected attribute is re-located to the top of the attribute selection shape. In another embodiment, the region representing the newly selected attribute may be re-located to a different position. For example the option pane may be displayed below the attribute selection shape and an arrow may connect the option pane to the bottom of the attribute selection shape. In such an embodiment, the region representing the newly selected attribute may be re-located to the bottom of the attribute selection shape.

In an embodiment, a customer selection of a new region or a selection to view additional regions of the attribute selection shape causes display of an animation of the attribute selection shape rotating to a new orientation, or the regions within the attribute selection shape rotating to new positions. The attribute selection shape 302, or the position of regions within the attribute selection shape, may rotate until the center of the region corresponding to the newly selected attribute is positioned at the top of the circle. For example, if a customer selects the Coating region 310 while the attribute selection shape is in the position depicted in FIG. 3, each of the regions may rotate counter-clockwise until the Coating region 310 is centered at the top of the attribute selection shape.

The direction of the rotation may depend on the positioning of the newly selected region relative to the currently selected region. For example, if the region corresponding to the newly selected attribute is located to the right of the region corresponding to the currently selected region, the attribute selection circle may rotate left, i.e. counterclockwise, until the newly selected region is centered at the top of the circle. Additionally, the coloring of the regions may change to indicate that the region corresponding to the newly selected attribute represents the currently selected attribute. "Rotating" as used herein does not necessarily mean that the same image of the attribute selection circle is rotated and then displayed again; in some embodiments, rotating the attribute selection circle may comprise displaying a first image depicting the attribute selection circle in a first portion and a second, different image depicting the attribute selection circle in a second position, where the second position appears to be a rotated form of the first position.

In some embodiments, selecting a new region causes one or more new regions to display. For example, when a customer selects the Coating region 310 while the attribute selection circle is in the orientation displayed in FIG. 3, the attribute selection circle may update such that Fabric region is relocated to the location of the Lining region, the Coating region is relocated to the location of the Fabric region 312, and a new region is displayed at the prior location of the Coating region 310. The Lining region 314 may no longer be visible.

The options for the attribute corresponding to a region may appear within the option pane 304 in response to a customer selecting the region. In an embodiment, the particular attribute may comprise sub-attributes, and sub-attributes and options corresponding to the sub-attributes may also be displayed within the option pane in response to the election.

In some embodiments, multiple attributes of a particular attribute group may be selected. In such a case, the option pane 304 may display information about options for each of the selected attributes. In another embodiment, the option pane 304 may only display information about options that are common for each of the attributes. For example, both a Text attribute and an Image attribute may be associated with a Size option. When both the Text attribute and Image attribute are selected, the option pane may display a text box for entering the size, and the information entered in the text box may be interpreted as an input customization option for both the Text and Image attribute.

In yet another embodiment, certain options may only be associated with a combination of certain attributes and information about such options may be displayed when each of the certain attributes are selected. For example, an option titled "Overlay text upon image?" may only be associated with a combination of the Text and Image attributes and may display when both the Text and Image attributes have been selected.

If two or more attributes are selected, the attribute selection shape may update to indicate that two or more attributes have been selected. For example, both of the selected regions may be shaded darker than the other regions in the attribute selection shape.

2.4 Selection of a Customization Option

At block 1560, customization specification collector 1406 receives a selection or an input of a particular customization option. A customer may select a customization options for a particular attribute by selecting an option within the option pane. Selecting an option may comprise selecting an option image or other information corresponding to the option, such as an option title. In other embodiments, the customer inputs a customization, such as text or an uploaded design. The input may be provided via input areas displayed within the option pane, such as a textbox or a drawing area.

At block 1570, customization specification collector 1406 updates a product image or an attribute images to indicate that the particular customization option has been selected or input.

An attribute image that annotates a particular attribute group location may be updated in response to a customer selecting a particular customization option for a particular attribute belonging to the attribute group. The attribute group location may be annotated with attribute images representing each attribute belonging to the attribute group that corresponds to the location and the attribute image representing the particular attribute may be updated to a new attribute image that is associated with the selected customization option.

Figure 7:
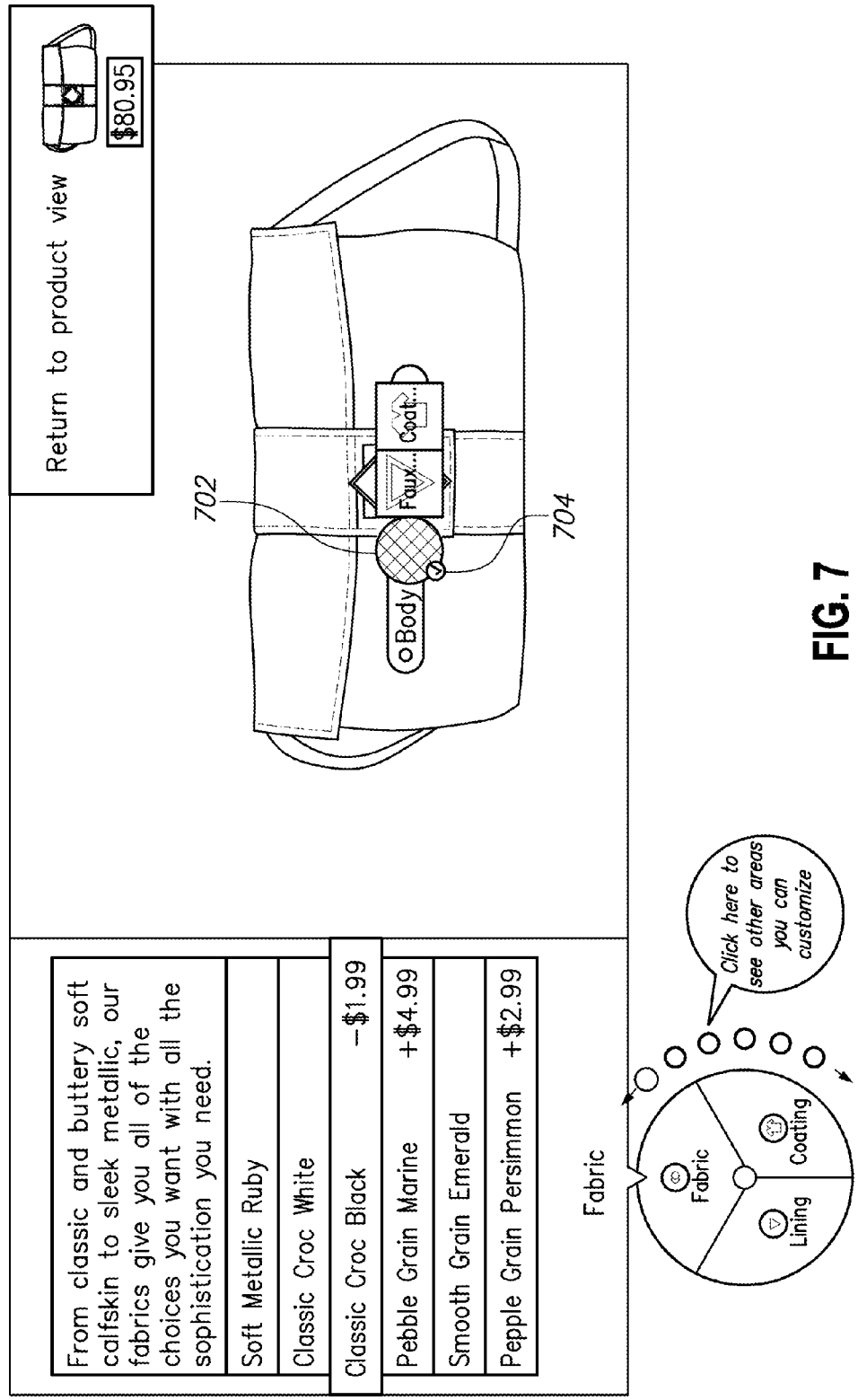
FIG. 7 illustrates an example graphical user interface that may be displayed in response to a customer selecting a particular customization option.

For example, a customer may select the Classic Croc Black customization option 320 for the Fabric attribute utilizing the graphical interface illustrated in FIG. 3. In response to the selection, the graphical interface of FIG. 7 may display. The attribute image corresponding to the Fabric attribute may be the left-most image 702 of the set of images that annotate the attribute group location corresponding to the Body attribute group. As depicted in FIG. 7, the attribute image 344 corresponding to the Fabric attribute in FIG. 3 may be replaced by an image 702 that depicts the selected customization option of Classic Croc Black.

The shape of the attribute image border may also change to indicate that a particular customization has been selected for the corresponding attribute. For example, in response to the selection of the particular customization option for the particular attribute, the border of the attribute image corresponding to the particular attribute may change from square to circle. In such an embodiment, a customer may determine whether an attribute image represents a selected attribute or some other attribute (e.g. a default attribute) based on whether the border has a square-shaped border or a circular border.

In an embodiment, the border shape is only changed if the selected customization option is different than the default customization option. For example, the default customization option may be depicted in the product image and the attribute image border may indicate whether a customization option different from the customization option depicted in the product image has been selected for a particular customization. In other embodiments, the shape of the border may change in response to a selection of a customization option regardless of if the selected customization option is a default customization option for the attribute.

In an embodiment, at least a portion of the product image corresponding to an attribute is blurred in response to a customer selection of a customization option that is different than the customization depicted in the product image for the attribute. For example, the product image may depict a customizable stuffed animal toy, such as the product image 1308 illustrated in FIG. 13. A customer may select a Bug face for the animal instead of a Puppy face. In response to the selection, at least the portion of the product image 1308 depicting a face may be blurred. In some embodiments, the entire product image 1308 is blurred. The product image may only depict a face portion of the stuffed animal toy or may also depict other portions of the stuffed animal toy. The blurring may indicate that the selected customization is different than the customization depicted in the product image. Additionally, an image depicting the Bug face (e.g., image 1310) may display upon the product image as an annotation to the attribute group location corresponding to the Face attribute. In other embodiments, the product image may be deemphasized in other ways in response to the selection of a customization option that is different than the depicted customization option. For example, the brightness of the product image may be reduced or the product image may be recolored.

Figure 18:
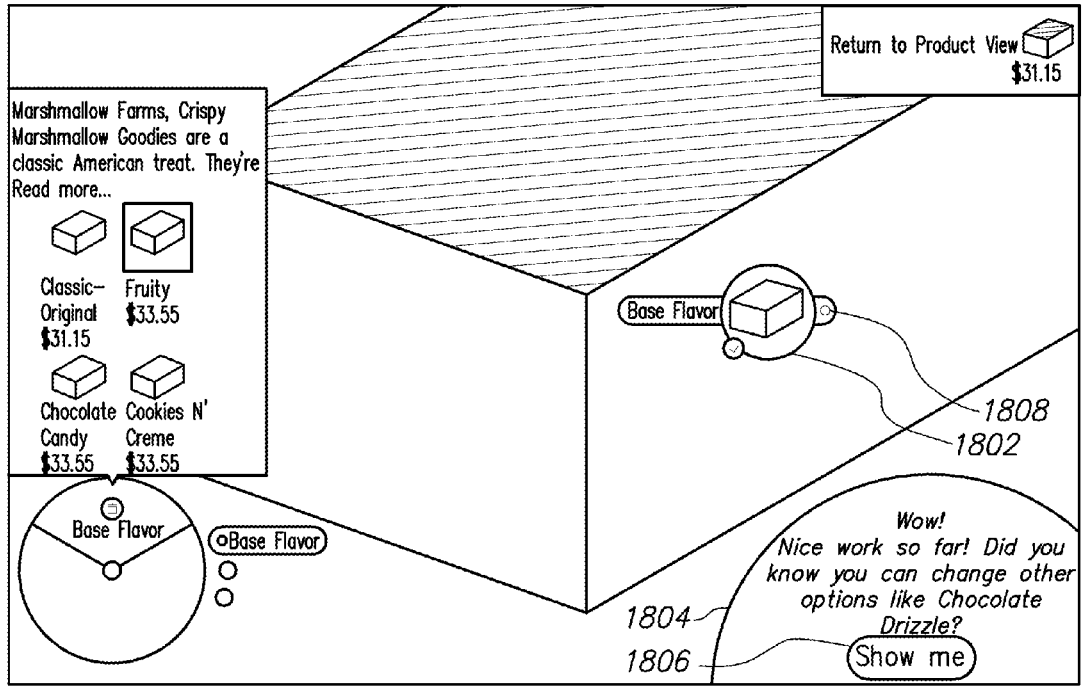
FIG. 18 is an example graphical interface that may display in response to the selection of a customization option using the graphical interface illustrated in FIG. 17.

To illustrate a clear example, FIG. 18 is an example graphical interface that may display in response to the selection of a customization option using the graphical interface illustrated in FIG. 17. Specifically, the graphical interface depicted in FIG. 18 may display in response to the selection of the customizable attribute of Fruity (via selection of attribute image 1704). Product image 1808 is a blurred version of the product image 1708 displayed before the selection of the customizable attribute of Fruity. Additionally attribute image 1802, which depicts a marshmallow treat with the selected base flavor of Fruity, annotates attribute location 1808 in place of attribute image 1702.

In other embodiments, the product image may be blurred once a customer selects a customization option for any attribute of a particular set of attributes, regardless of if the selected customization option is the same as the customization option depicted in the product image.

Other annotations may be added or modified in response to a selection of a customization option. In an embodiment, as depicted in FIG. 7, in response to a selection or input of a customization option, a checkmark symbol 704 may be added as an annotation to attribute image 702, which is the attribute image corresponding to the particular attribute that is customized. The corresponding attribute image 702 may also animate in response to the selection, for example by enlarging briefly.

Figure 16:
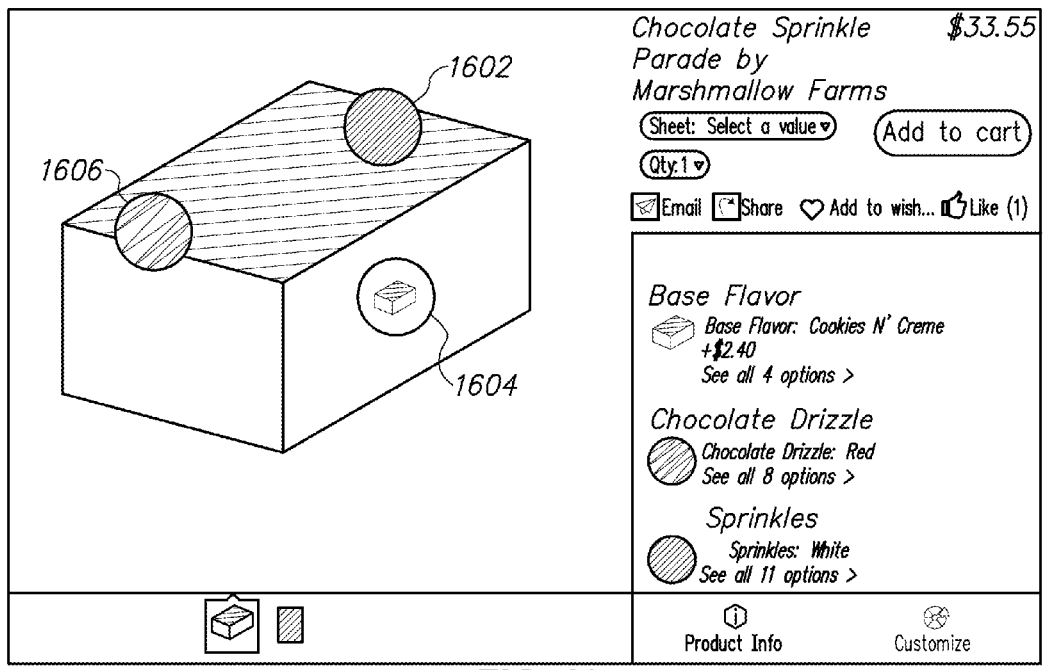
FIG. 16 illustrates an example graphical interface that identifies which customization options have been selected.

FIG. 16 illustrates an example graphical interface that identifies which customization options have been selected. In the embodiment illustrated in FIG. 16, an attribute image only annotates an attribute location corresponding to an attribute if a customization options has been specified for the attribute. To illustrate a clear example, product image 1608 depicts a customizable marshmallow treat. Customization specification collector 1406 may cause attribute image 1602, which depicts the customization option of White for the attribute of Sprinkles to display based on a determination that a selection of the customization option of White was received, attribute image 1604, which depicts the customization option of Cookies n' Creme for the attribute of Base Flavor to display based on a determination that a selection of the customization option of Cookies n' Creme was received, and attribute image 1606, which depicts the customization option of Red for the attribute of Chocolate Drizzle to displayed based on a determination that a selection of the customization option of Red was received. The graphical interface of FIG. 16 may display at the customer system from with the customization option selections were received (e.g., customer system 1402).

If a customization option has not been selected for a particular attribute, the attribute location corresponding to the particular attribute may not be annotated with any attribute image. For example, if the customization specification collector 1406 determines that a customer associated with customer system 1402 has not yet selected a customization option for the attribute Chocolate Drizzle, the attribute location corresponding to the Chocolate Drizzle attribute may not be annotated or may be annotated by a circular symbol and the attribute heading of Chocolate Drizzle instead of attribute image 1606.

By viewing a display of the type depicted in FIG. 16, a customer may be better able to fully review each of his selections or inputs of customization options. In some embodiments, the customer may also easily identify attribute or attribute groups for which selections have not been made by determining which attribute group locations are not annotated with attribute images.

Customization specification collector 1406 may cause the graphical interface of FIG. 16 to display in response to receiving a selection to enter a different mode of the customization interface after a customer has selected customization options for one or more attributes.

2.5 Updating Product Image

Figure 8:
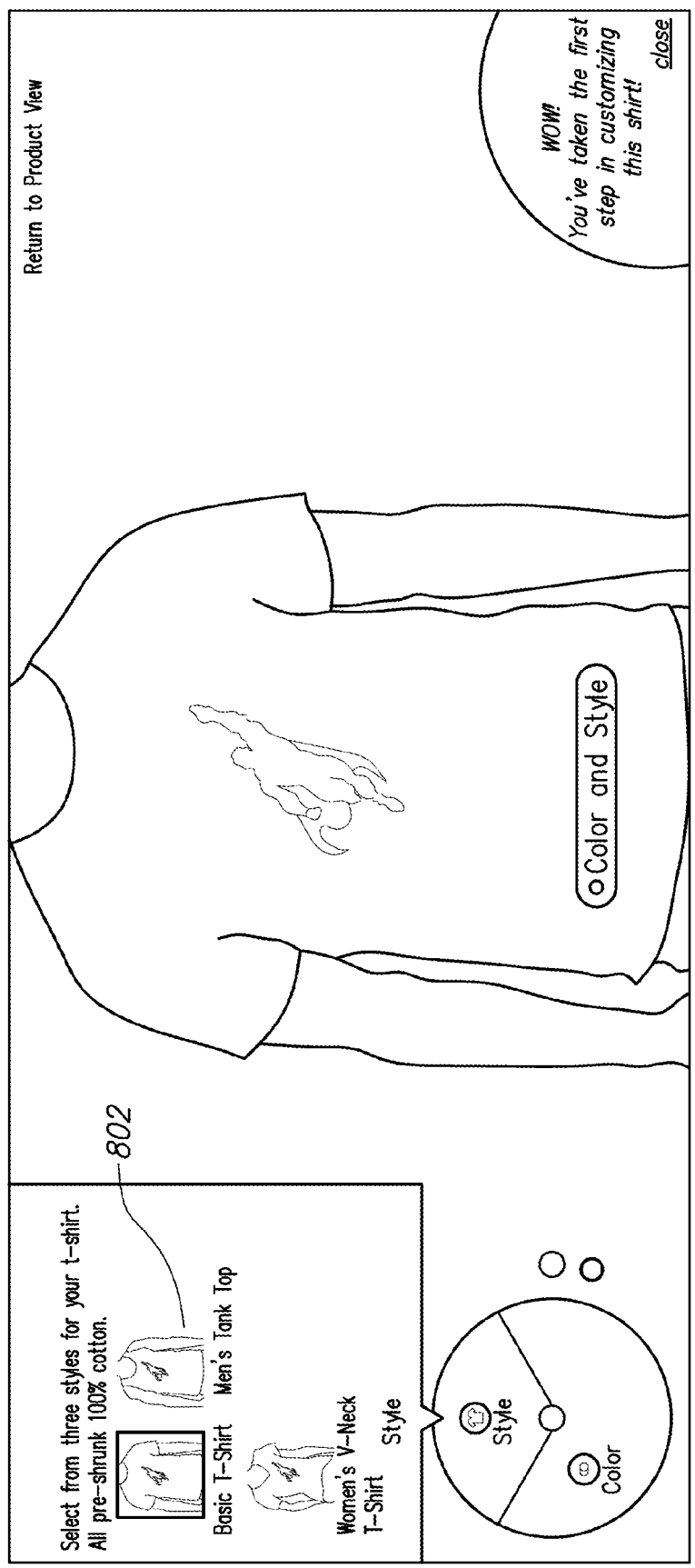
FIG. 8 depicts an example graphical interface before a customer selection of a particular customization option.
Figure 9:
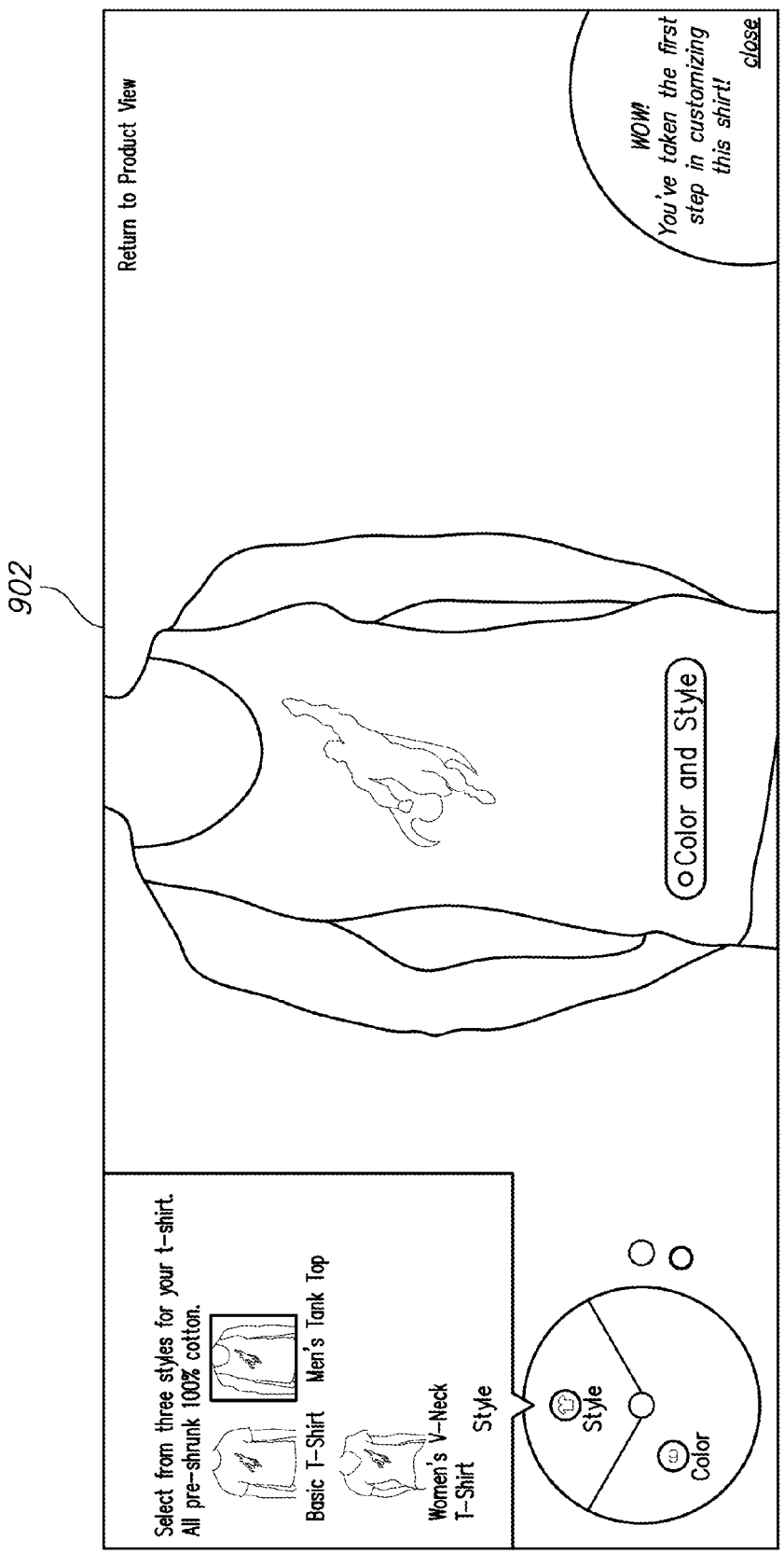
FIG. 9 illustrates an example graphical user interface which may be displayed after a customer selection of an example customization option.

In certain embodiments, only an attribute image which annotates a product image updates in response to the selection or input of a customization option. In other embodiments, the product image itself may be updated to display a different product image that depicts the selected customization. For example, FIG. 8 depicts an example graphical interface before a customer selection of a particular customization option. Using the graphical interface illustrated in FIG. 8, a customer may select the Men's Tank Top customization option represented by image 802 for the Style attribute. In response, the example graphical interface of FIG. 9 may display. As depicted in FIG. 9, the product image displayed in FIG. 8 is changed to product image 902, which depicts a shirt customized with the Men's Tank Top style.

In an embodiment, multiple customization options may be selected for a particular attribute. For example, the customizable item may be a chocolate bar and a customer may select both a Pistachio option and a Pine Nut option for an Ingredient attribute.

At block 1580, customization specification collector 1406 stores a customization specification. The customization specification may include each of the customizable options selected or input by the customer. The customization specification may be utilized to make the customized product as specified by the customer. In an embodiment, customization specification collector 1406 determines customization instructions based on the obtained customization specification and transmit the customization instructions to a system local to the maker, such as maker system 1410. The maker may be an entity separate from customization specification collector 1406 that makes the customization product in response to receiving the customization instructions.

An approach where only the attribute image annotations update instead of the entire product image updating offers unique advantages over an approach where the entire product image is updated. In many cases, it may be difficult to photograph every combination of customization option selections or even to computationally generate photographs that depict each such combination. Such photographs may be needed in certain approaches where each combination of customization options that a customer may select is fully visualized in the product image in response to the customer's selections. In contrast, in an approach where only the attribute image annotations update rather than the entire product image updating, fewer photographs may be needed. For example, in the embodiment of FIG. 16, there are four (4) options for base flavors, eight (8) options for chocolate drizzle colors, and eleven (11) options for sprinkles colors. It may be difficult to obtain an image depicting each combination of the 352 combinations of marshmallow treats that are possible. It may be simpler to obtain twenty-three (23) images total, including four (4) images depicting each of the four (4) base flavor options, eight (8) images depicting each of the (8) chocolate drizzle color options, and eleven (11) images depicting each of the eleven (11) sprinkles color options. By displaying an attribute image depicting the selected customization option in association with a location that corresponds to the attribute being customized, a customer would still better appreciate how the customized product would appear as compared to a traditional approach of a swatch being displayed under a main image. At the same time, such an approach would relieve the manufacturer or some other third party from the burden of photographing or generating a product image that depicts each possible combination of customization options.

In yet another embodiment, the product image may update to depict a selected customization option for a customization option selection provided for an attribute that is designated as a "base" attributes and, for other attributes, the product image may be annotated with attribute images depicting the selected customization option rather than the product image being replaced by an updated product image that depicts the selected customization option. For example, customer system 1402 may specify that the Base Flavor attribute of the marshmallow treat depicted in FIG. 16 is a base attribute and customer system 1402 may provide four (4) product images, each of which depicts the entire marshmallow treat but depicts a different type of base flavor of the four (4) base flavors. For any selection of a customization option for the Base Flavor attribute, if the selected customization option is different than the customization option currently depicted by product image 1608 (which may be the previously selected customization option or a default customization option), product image 1608 may be replaced by a product image depicting to the selected customization option. For other attributes that are not designated as base attributes, only the attribute image annotations may change and there may be no updates to the displayed product image.

The base attribute may be an attribute that is most essential to the item being customized and/or most drastically changes the nature of the customizable product out of all the attributes that may be customized. For many products, it may be helpful to the customer to view a full product visualization of at least such an attribute, even if the other customization option selections are visualized using attribute image annotations. For example, if the item being customized is a stuffed animal, a customer may wish to view at least a full product visualization of the animal type (e.g., lion, mouse, cat) but may be content with only seeing selections for other attributes (e.g., color, material type) being identified using attribute image annotations.

In most embodiments, a maker of the attribute designates a single attribute of the customizable product as a base attribute in a maker specification although, in other cases, multiple attributes may be designated as base attributes. Also in some embodiments, entities other than the maker can designate an attribute as the base attributes.

FIG. 15 only illustrates a portion of the steps of an example process for displaying customization options and receiving customization option selections and customization inputs. Additional steps may be performed in between the steps illustrated in FIG. 15 and/or the ordering of steps may be changed. For example, a customer my select a plurality of different attributes before selecting a particular customization option and the steps illustrated at blocks 1540 and 1550 may repeat plurality of different times until a selection or input of a particular customization option is received at block 1560. Similarly, portions of the process may repeat for each customization option selected by a customer.

2.6 Design Areas

In some embodiments, the customizable product may be customized to include a particular user-submitted design. The design may be text, image(s), or pattern(s). For example, a user may input a custom image for imprinting upon the customizable item or text for engraving upon the item. Particular region(s) of the customizable item upon which such designs may be added may be referred to as design areas.

Figure 10:
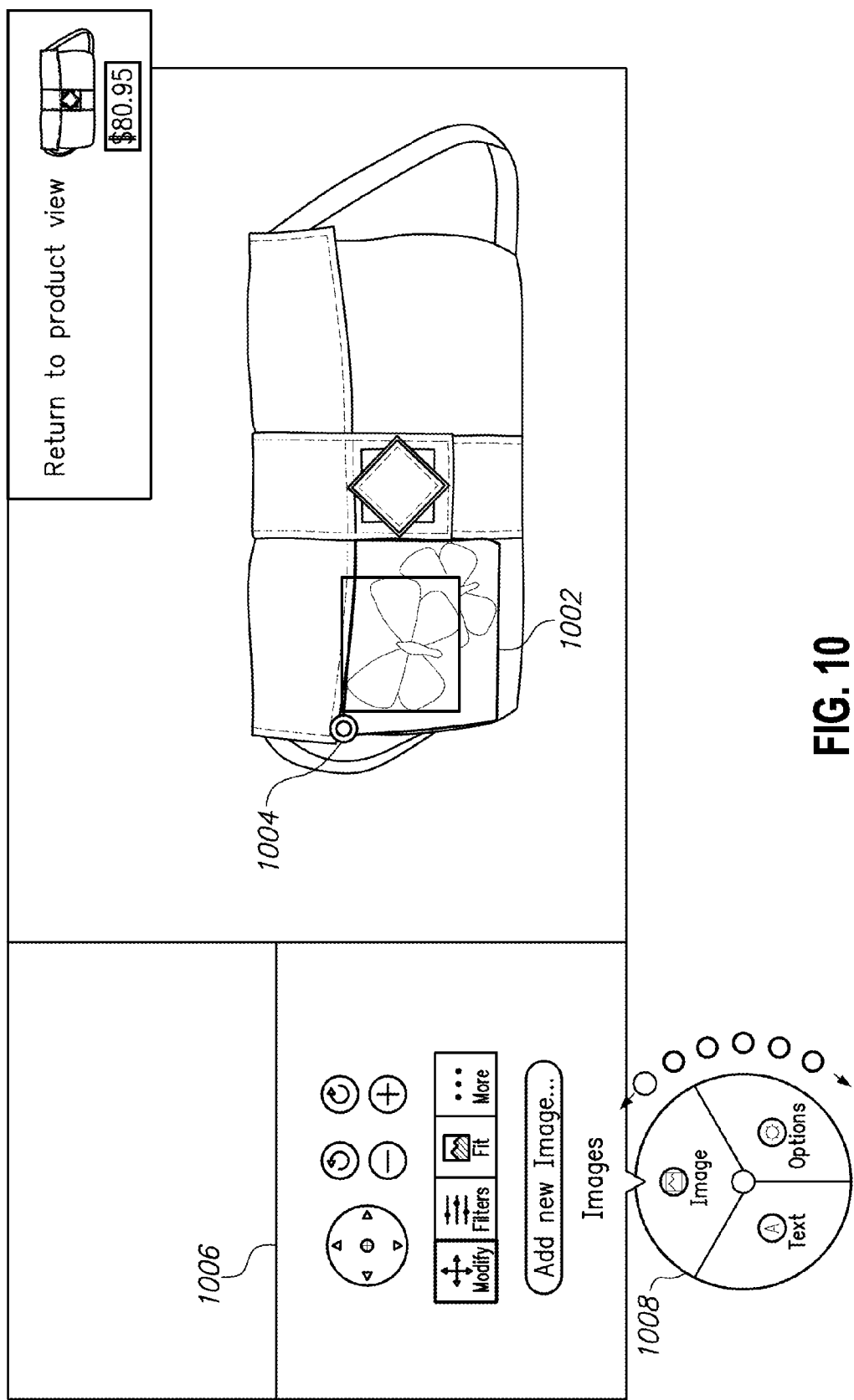
FIG. 10 illustrates an example graphical interface which displays customization options for a design area.

In an embodiment, an annotation upon a product image may identify a design attribute group location which corresponds to a design attribute group comprising attributes of a design area. FIG. 10 illustrates an example graphical interface which displays customization options for a design area. The design area 1002 may be the portion of the purse featuring a butterfly graphic. The single circular symbol 1004 upon the product image in FIG. 10, which is located at the upper-left corner of design area 1002, may represent the design attribute group location corresponding to the design area 1002.

The design attribute group may include attributes, such as Text, Image, and Options. A customer may not be required to select a customization for each attribute. For example, a customer may input an image for the Image attribute but may not input text. FIG. 10 depicts customization options for the Image attribute of the design attribute group, represented by region 1008. Using the components displayed in the option pane 1006, a customer may specify a customization option for the Image attribute by changing the location of the image, uploading an image, editing the image, applying a filter to the image, arranging the image, changing the orientation of the image, and providing various other option selections or inputs for the Image attribute.

Figure 11:
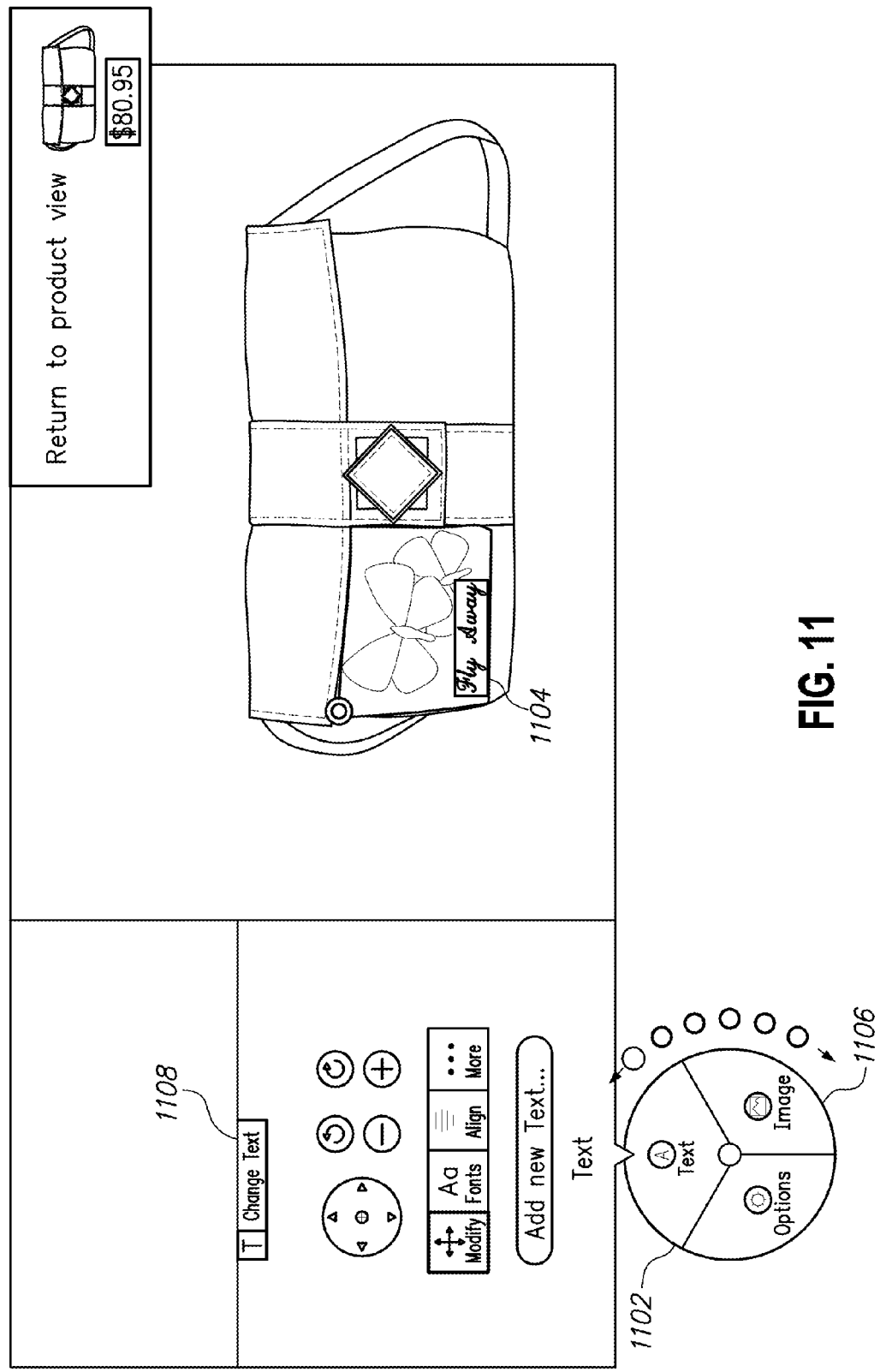
FIG. 11 illustrates example customization options for attributes of an example design attribute group.
Figure 12:
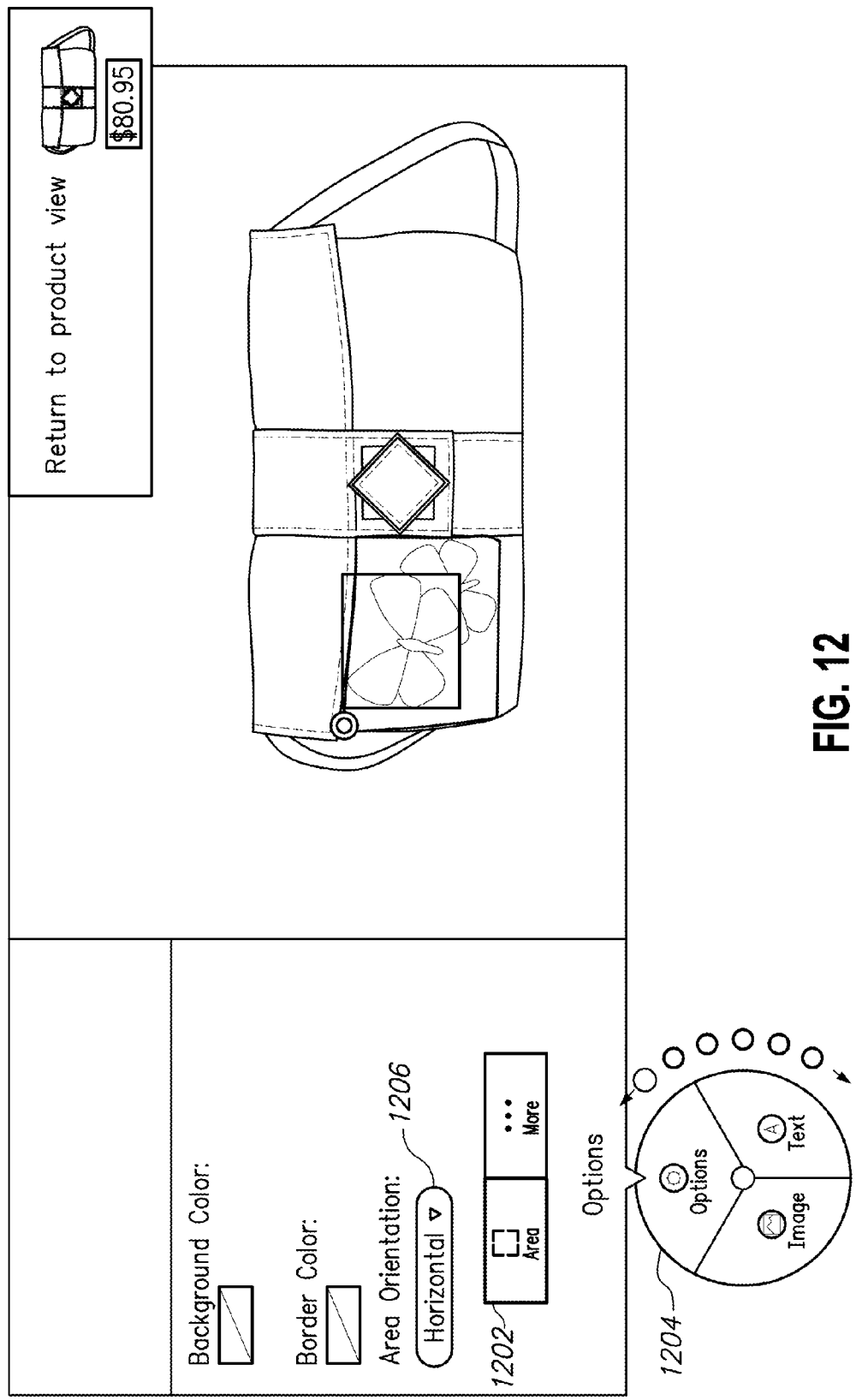
FIG. 12 illustrates example customization options for attributes of an example design attribute group.

FIG. 11 depicts customization options for the Text attribute of the design attribute group, which is represented by region 1102, and FIG. 12 depicts customization options for the Options attribute of the design attribute group, which is represented by region 1204. Various sub-attributes for a particular attribute may be identified in an option pane corresponding to an attribute. For example, as depicted in FIG. 12, Area Orientation, which is represented by control 1202, may be a sub-attribute of the Options attribute and the options for controlling the orientation of the design area may be viewed by selecting the drop-down menu 1206.

When a particular design is selected, the design may be overlaid upon the product image. Particular options for an image attribute may be selected by interacting with the overlaid design. For example, the location of the design area may be selected by selecting and dragging an overlaid design to a different location. Additionally, selecting the overlaid design on the product image may comprise a selection of the design attribute group when a different attribute group is selected. Selecting the overlaid design on the product image may cause the attribute selection shape to update to display regions representing the design attributes. For example, a selection of the overlaid text 1104 in FIG. 11 may cause attribute selection shape 1106 to update to depict a selection of region 1102 representing the Text attribute if the Text attribute was not already selected. Option pane 1108, which displays options for the Text attribute, may display in response to the selection of overlaid text 1104.

Figure 20:
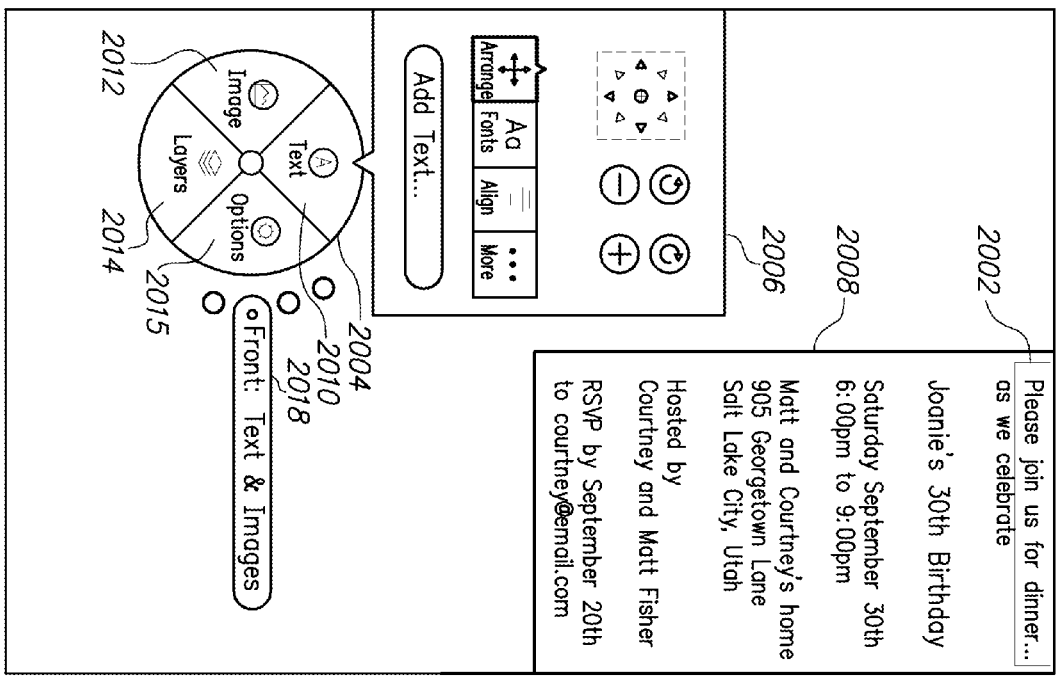
FIG. 20 illustrates an example graphical interface using which a customer may select a design attribute by selecting a location in a region of the product image that corresponds to the design attribute.

In some embodiment, a customer may select a design attribute by selecting a location in a region in a product image that corresponds to the design attribute, such as the region in the product where the design will be applied. For example, FIG. 20 illustrates an example graphical interface using which a customer may select a design attribute by selecting a location in a region of the product image that corresponds to the design attribute (e.g. by using a cursor and clicking, or gesturing over the location in the product image). FIG. 20 may display in response to the selection of the Front: Text & Images attribute. Product image 2008 depicts an event invitation that may be customized. Heading 2018 indicates that the currently selected attribute is Front: Text & Images.

Attribute selection shape 2004 includes regions 2010 and 2012 which respectively represent the attributes of Text and Images. Region 2014 may be selected to view different layers of the Front: Text & Images attribute group, as described in more detail in the description of FIG. 22. Region 2016 may be selected to view more attributes of the Front: Text & Images attribute group.

A customer may select the Text attribute of the attribute group of Front: Text & Images by selecting a location within region 2002. In response to the selection of a location within region 202, attribute selection shape 2004 may update to indicate that the Text attribute is the selected attribute and option pane 2006 may display. For example, if attribute selection shape 2004 is in a position different than the position depicted in FIG. 20 prior to the selection, in response to the selection of a location within region 2002, attribute selection shape 2004 may rotate until region 2010 is located at the top of attribute selection shape 2004. Option pane 2006 contains different controls using which the customer may select or input different customization options for the Text attribute.

Figure 21:
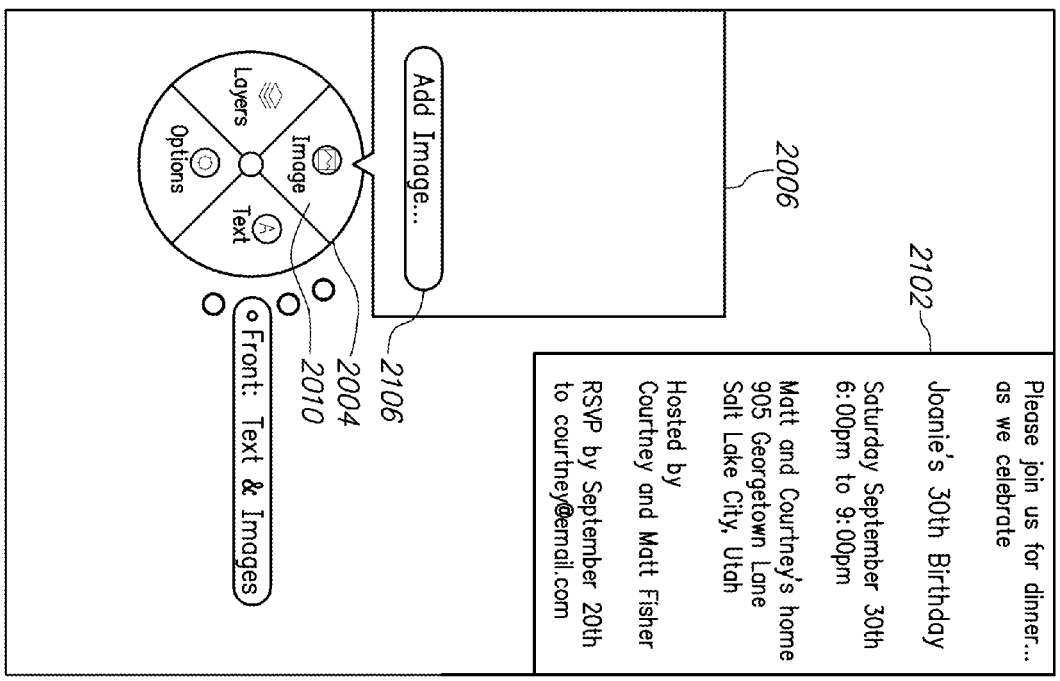
FIG. 21 illustrates an example graphical interface that displays in response to the selection of a location within a particular region of the displayed product image corresponding to a design attribute.

FIG. 21 illustrates an example graphical interface that displays in response to the selection of a location within a particular region of the displayed product image corresponding to a design attribute. Specifically, region 2102 in FIG. 21 corresponds to the attribute of Image. In response to a customer selecting a location within region 2102, attribute selection shape 2004 updates to indicate that the attribute of Image has been selected. For example, attribute selection shape 2004 may rotate until region 2010, which corresponds to the Image attribute, is displayed at the top of the attribute selection shape 2004. Further in response to the customer selection within region 2102, option pane 2006, which contains control 2106 for uploading images, displays.

Figure 22:
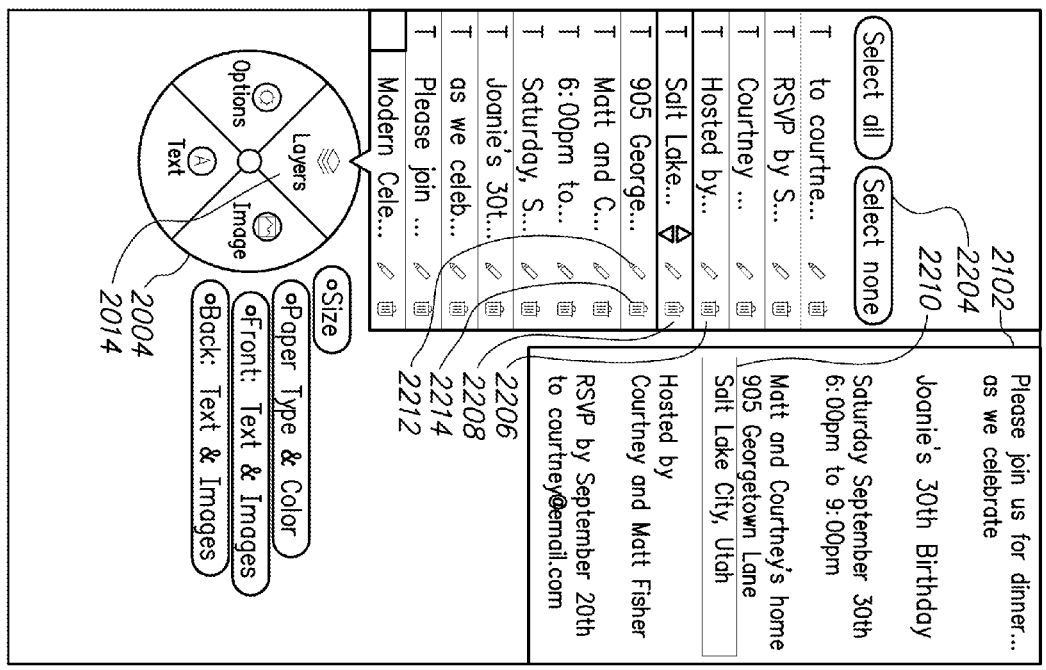
FIG. 22 illustrates an example interface using which a customer may modify different design layers of a customizable item.

FIG. 22 illustrates an example graphical interface using which a customer may modify different design layers of a customizable item. The graphical interface depicted in FIG. 22 may display in response to the selection of region 2014 in attribute selection shape 2004. As used herein, "layers" are individual components of the customizable item that may be customized.

Layer pane 2204 identifies different layers of the customizable event invitation depicted in product image 2102. Layer control 2208 corresponds to the text of "Salt Lake City, Utah" in region 2210, which may be customized to include different text. Similarly, layer control 2202 corresponds to the text of "Hosted by," which may also be customized to include different text. Layer control 2206 corresponds to the background image of the event invitation, which may be customized to include a different background image. In some cases, a customer may find it easier to review and select from the list of layers identifying different design components in layer pane 2204 as opposed to independently selecting each layer thorough interaction with product image 2102.

Control 2212 may be selected to delete the corresponding component from the customizable event invitation, which in this case is the text "Salt Lake City, Utah." The selection of control 2214 may cause the appearance of a text box, using which a customer may edit what text appears in the corresponding region of the customizable event invitation.

Although the product images illustrated in FIGS. 10, 11, 20 and 21 may update in response to the selection or input of a design in a design area, in other embodiments, the selection or input of a design for a design area may be illustrated in other ways (e.g. by display of an attribute image that depicts the selected or input design as an annotation upon the product image).

In an embodiment, a graphical interface may include an "Art View" control, which when selected, causes the display of the product image in the "Art View" mode. When in the "Art View" mode, the perimeters of one or more different design areas of the product are identified to the user. For example, the perimeters of the one or more design areas may be emphasize in some way (e.g. outlined in red-colored lines) to indicate that the customer may specify a design to be included in the design area.

2.7 Guided Discovery of Customizable Attributes

In some embodiments guided discovery messages may guide the customer through the different attributes that can be customized and/or the different available customization options. A guided discovery message may indicate how a customer can select customization options. For example, message 1706 is connected to an indicator which points to option pane 1712, which includes different attribute images that may be selected to indicate selection of the corresponding customization option depicted in the attribute image. Message 1706 may display in response to the selection of the Base Flavor attribute.

As another example, message 1804 in FIG. 18 may display in response to the selection of a customization option for the Base Flavor attribute. Message 1804 identifies an additional attribute that may be customized (e.g., Chocolate Drizzle). Customization specification collector 1047 may only cause message 1804 to display based on a determination that a selection for the Chocolate Drizzle attribute has not yet been received by the customer device at which FIG. 18 is displayed.

Figure 19:
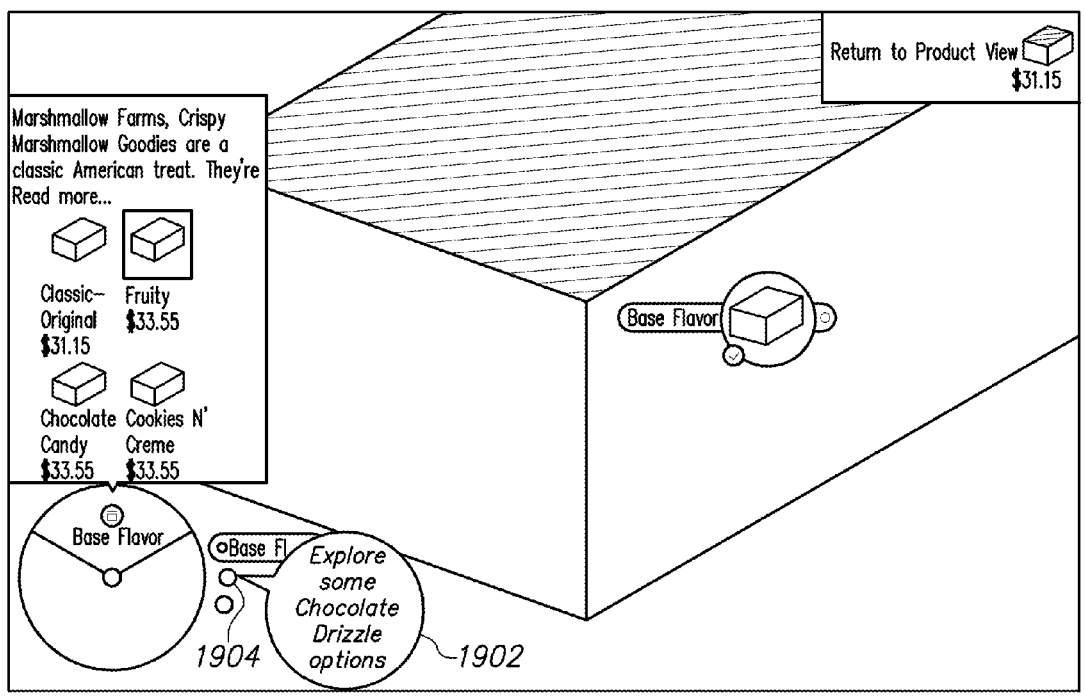
FIG. 19 illustrates an example graphical interface that may display in response to the selection of a guided discovery control displayed in FIG. 18.

Message 1804 may also include a guided discovery control 1806, which when selected, causes the display of an annotation that identifies the control for selecting the additional attribute. For example, FIG. 19 illustrates an example graphical interface that may display in response to the selection of guided discovery control 1806 displayed in FIG. 18. Message 1902 identifies the Chocolate Drizzle attribute and is connected to an indicator that points to control 1904, which may be used to select the Chocolate Drizzle attribute. In response to control 104 being selected, customization options for customizing the Chocolate Drizzle attribute may display.

Figure 23:
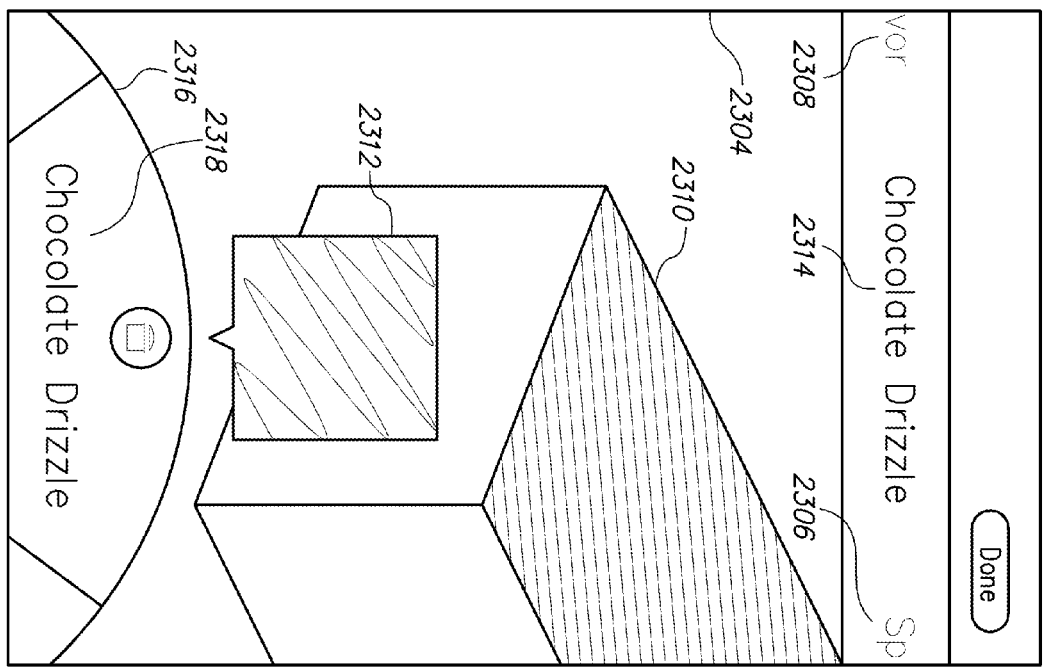
FIG. 23 illustrates another graphical interface which may be used to specify customization option selections and inputs for the customization of a customizable item.

2.8 Additional Graphical User Interfaces for the Specification of Customization Option Selections FIG. 23 illustrates another graphical interface that may be used to specify customization option selections and input for the customization of a customizable product. Customization specification collector 1406 may cause the graphical interface of FIG. 23 to display at a customer system 1402 in response to detecting that customer system 1402 is a mobile device.

Product image 2310 depicts the customizable item being customized. Region 2302 identifies different attribute groups, each of which include one or more attributes of the customizable item that may be customized. For example, text 2314, which is centered in region 2302, indicates that Chocolate Drizzle is the currently selected attribute group. Partially visible text 2306 identifies the attribute group of Sprinkles which may be selected by swiping to the left near or on region 2302. Partially visible text 2308 identifies the attribute group of Base Flavor which may be selected by swiping to the right near or on region 2302.

Attribute selection shape 2316 identifies the attributes of the currently selected attribute group of Chocolate Drizzle. In this case, the Chocolate Drizzle attribute contains a single attribute of Chocolate Drizzle. Attribute image 2312 depicts the default attribute of Green for the Chocolate Drizzle attribute. Additional customization options for the Chocolate Drizzle attribute may be viewed by swiping to the right or left on or near attribute image 2312. Such a selection to view additional customization options may cause a different attribute image depicting a different customization option to display in place of attribute image 2312.

Figure 24:
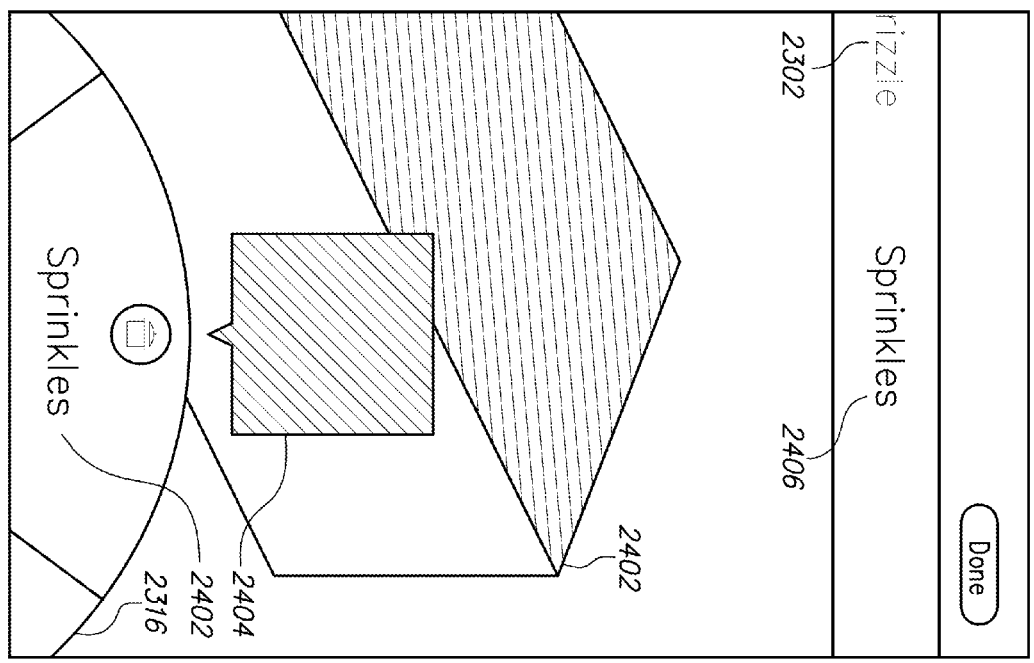
FIG. 24 illustrates an example graphical interface that may display in response to the selection of a particular attribute group.

FIG. 24 illustrates an example graphical interface that may display in response to the selection of the Sprinkles attribute group identified by text 2406. In response to the selection of the Sprinkles attribute group, attribute selection shape 2316 updates to display region 2402 centered at the top of attribute selection shape 2316 in place of region 2318. Additionally, product image 2402 depicts a different region of the customizable marshmallow treat than product image 2310. Specifically, product image 2402 is focused on the attribute location corresponding to the Sprinkles attribute and the surrounding region, whereas product image 2310 is focused on the attribute location corresponding to the Chocolate Drizzle attribute and the surrounding region.

Figure 25:
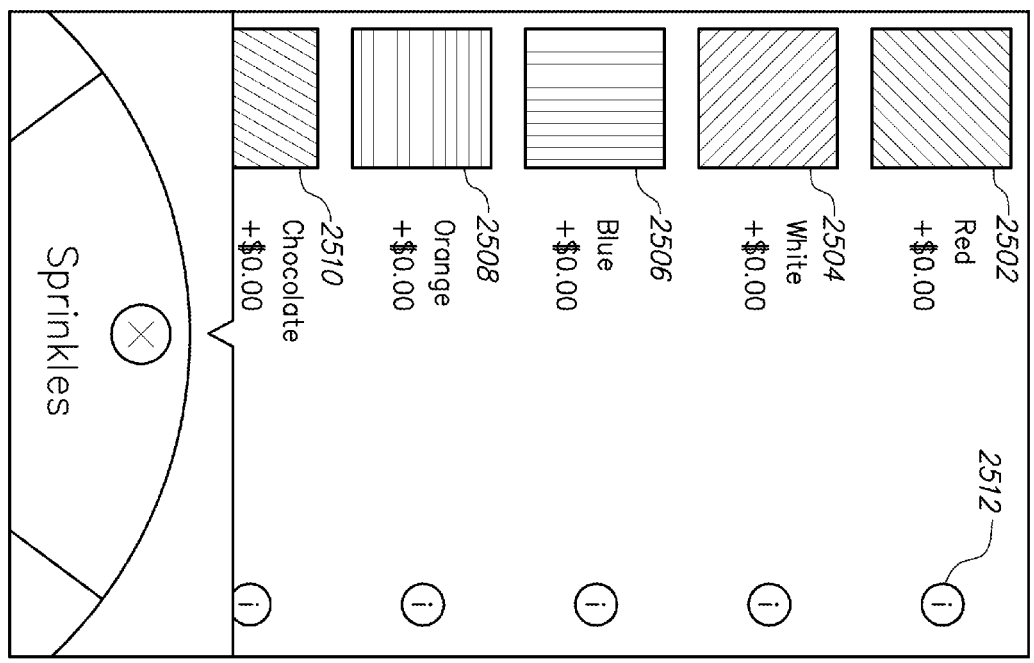
FIG. 25 illustrates an example graphical interface that identifies customization options for an example attribute.

FIG. 25 illustrates an example graphical interface that identifies customization options for the Sprinkles attribute. The graphical interface of FIG. 25 may display in response to the selection of attribute image 2404 of FIG. 24. Attribute images 2502, 2504, 2506, 2608, and 2610 respectively depict the customization options of Red, White, Blue, Orange, and Chocolate. A customer may select a customization option by selecting the corresponding attribute image.

2.9 Onboarding of Customizable Product Options

The product images, attributes, and customization options may be received by customization specification collector 1406 from a maker, a seller, some other third party, or an automated system may generate or determine the product images, attributes, and customization options. In some embodiments, the product images and/or attribute images may be obtained using automated imaging techniques such as the type described in application Ser. No. 14/243,840, filed Apr. 2, 2014, the entire contents of which are incorporated herein by reference.

The identification of which attributes are customizable and the different customization options for each attribute may be specified in a maker specification. The maker specification may include data provided by the maker to customization specification collector 1406 or an associated system using maker system 1410. The maker may also specify associations between attribute images and their corresponding attributes or customization options. Examples techniques for receiving the specification of available customization options are described in application Ser. No. 13/844,081, filed Mar. 15, 2013, the entire contents of which are incorporated herein by reference. In other embodiments, the associations may be automatically detected using techniques such as the type described in application Ser. No. 14/243,840, filed Apr. 2, 2014.

In certain embodiments, a maker, customer, or some other entity may provide a photograph of a particular instance of a customizable product along with a specification of the customization options that the customizable product is customized with. Customization specification collector 1406 may store each such product instance photograph in association with the specified customization options. Each customization option may be associated with a plurality of photographs that depict different customizable product instances that are customized with the customization option.

In response to receiving a selection of a customization option from customer system 1402, customization specification collector may select and display a product instance image from the set of product instance images associated with the customization option to display. The product instance image may be displayed as an attribute image, product image, or separate from the attribute and product images.

The graphical interfaces illustrated herein are only provided for the purposes of illustrating a clear example. No aspect of the graphical interfaces illustrated herein is required by any of the claims, unless recited in the claims. For example, in other embodiments that are not illustrated, certain controls may cause the same functionality to occur as described in connection with one of FIGS. 1-13 and 16-26 but the controls may have a different appearance or associated title than as depicted in one of FIGS. 1-3 and 16-26.

Embodiments of graphical interfaces described herein allow customers to easily review the attributes of a customizable product that are eligible for customization and the available customization options for customizing the various attributes. Embodiments also enable a customer to more easily review the customization options that have been selected or input for each attribute. Thus, embodiments described herein allow a customer to more easily understand and specify how a particular product is to be customized.

3. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, televisions, wearable computing devices, networking devices or any other device that incorporates hard-wired and/or program logic to implement the techniques.

For example, FIG. 28 is a block diagram that illustrates a computer system 2800 upon which an embodiment of the invention may be implemented. Computer system 2800 includes a bus 2802 or other communication mechanism for communicating information, and a hardware processor 2804 coupled with bus 2802 for processing information. Hardware processor 2804 may be, for example, a general purpose microprocessor.

Computer system 2800 also includes a main memory 2806, such as a random access memory (RAM) or other dynamic storage device, coupled to bus 2802 for storing information and instructions to be executed by processor 2804. Main memory 2806 also may be used for storing temporary variables or other intermediate information during execution of instructions to be executed by processor 2804. Such instructions, when stored in non-transitory storage media accessible to processor 2804, render computer system 2800 into a special-purpose machine that is customized to perform the operations specified in the instructions.

Computer system 2800 further includes a read only memory (ROM) 2808 or other static storage device coupled to bus 2802 for storing static information and instructions for processor 2804. A storage device 2810, such as a magnetic disk, optical disk, or solid-state drive is provided and coupled to bus 2802 for storing information and instructions.

Computer system 2800 may be coupled via bus 2802 to a display 2812, such as a cathode ray tube (CRT), for displaying information to a computer user. An input device 2814, including alphanumeric and other keys, is coupled to bus 2802 for communicating information and command selections to processor 2804. Another type of user input device is cursor control 2816, such as a mouse, a trackball, or cursor direction keys for communicating direction information and command selections to processor 2804 and for controlling cursor movement on display 2812. This input device typically has two degrees of freedom in two axes, a first axis (e.g., x) and a second axis (e.g., y), that allows the device to specify positions in a plane.

In some embodiments, a customer interacts with computer system 2800 via touch, for example, by tapping or gesturing over certain locations. A display screen of display 2812 may also be capable of detecting touch.

Computer system 2800 may implement the techniques described herein using customized hard-wired logic, one or more ASICs or FPGAs, firmware and/or program logic which in combination with the computer system causes or programs computer system 2800 to be a special-purpose machine. According to one embodiment, the techniques herein are performed by computer system 2800 in response to processor 2804 executing one or more sequences of one or more instructions contained in main memory 2806. Such instructions may be read into main memory 2806 from another storage medium, such as storage device 2810. Execution of the sequences of instructions contained in main memory 2806 causes processor 2804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2810. Volatile media includes dynamic memory, such as main memory 2806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2802. Transmission media can also take the form of acoustic or light waves, such as those generated during radio-wave and infra-red data communications.

Various forms of media may be involved in carrying one or more sequences of one or more instructions to processor 2804 for execution. For example, the instructions may initially be carried on a magnetic disk or solid-state drive of a remote computer. The remote computer can load the instructions into its dynamic memory and send the instructions over a telephone line using a modem. A modem local to computer system 2800 can receive the data on the telephone line and use an infra-red transmitter to convert the data to an infra-red signal. An infra-red detector can receive the data carried in the infra-red signal and appropriate circuitry can place the data on bus 2802. Bus 2802 carries the data to main memory 2806, from which processor 2804 retrieves and executes the instructions. The instructions received by main memory 2806 may optionally be stored on storage device 2810 either before or after execution by processor 2804.

Computer system 2800 also includes a communication interface 2818 coupled to bus 2802. Communication interface 2818 provides a two-way data communication coupling to a network link 2820 that is connected to a local network 2822. For example, communication interface 2818 may be an integrated services digital network (ISDN) card, cable modem, satellite modem, or a modem to provide a data communication connection to a corresponding type of telephone line. As another example, communication interface 2818 may be a local area network (LAN) card to provide a data communication connection to a compatible LAN. Wireless links may also be implemented. In any such implementation, communication interface 2818 sends and receives electrical, electromagnetic or optical signals that carry digital data streams representing various types of information.

Network link 2820 typically provides data communication through one or more networks to other data devices. For example, network link 2820 may provide a connection through local network 2822 to a host computer 2824 or to data equipment operated by an Internet Service Provider (ISP) 2826. ISP 2826 in turn provides data communication services through the world wide packet data communication network now commonly referred to as the "Internet" 2828. Local network 2822 and Internet 2828 both use electrical, electromagnetic or optical signals that carry digital data streams. The signals through the various networks and the signals on network link 2820 and through communication interface 2818, which carry the digital data to and from computer system 2800, are example forms of transmission media.

Computer system 2800 can send messages and receive data, including program code, through the network(s), network link 2820 and communication interface 2818. In the Internet example, a server 2830 might transmit a requested code for an application program through Internet 2828, ISP 2828, local network 2822 and communication interface 2818.

The received code may be executed by processor 2804 as it is received, and/or stored in storage device 2810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
a first computer causing display of a graphical user interface that depicts a product image of a customizable product on a second computer, wherein the graphical user interface depicts one or more annotations at respective locations within the product image, wherein each annotation of the one or more annotations is associated with a respective one or more attributes;
the first computer receiving a first electronic message indicating user selection of a particular annotation of the one or more annotations;
in response to receiving the user selection of the particular annotation, the first computer causing the graphical user interface to display one or more default attribute images corresponding to the respective one or more attributes associated with the particular annotation and one or more options associated with a particular attribute of the respective one or more attributes associated with the particular annotation;

the first computer receiving an electronic message indicating user selection of a particular option of the one or more options associated with the particular attribute;

in response to receiving the user selection of the particular option, the first computer:

determining that the particular option is not a default option of the particular attribute;

causing the graphical user interface to update the display of the one or more default attribute images to replace a default attribute image corresponding to the particular attribute with an attribute image associated with the particular option; and causing the graphical user interface to blur a portion of the product image that corresponds to the particular attribute, wherein the attribute image associated with the particular option is different than the default option of the particular attribute displayed in the blurred portion of the product image.

2. The method of claim 1, further comprising:

the first computer receiving an electronic message indicating user selection of the default option;

in response to the first computer receiving the user selection of the default option, the first computer causing the graphical user interface to remove the blur from the portion of the product image that corresponds to the particular attribute.

3. The method of claim 1, further comprising:

the first computer receiving an electronic message indicating user selection of a second particular attribute of the respective one or more attributes associated with the particular annotation;

in response to the first computer receiving the user selection of the second particular attribute, the first computer causing the graphical user interface to display a second one or more options associated with the second particular attribute.

4. The method of claim 1, wherein the one or more options and the one or more default attribute images are displayed within the graphical user interface concurrently with the product image.

5. The method of claim 1, wherein the graphical user interface includes an annotation that corresponds to a design area and is associated with one or more attributes that include one or more of: an image attribute or a text attribute.

6. The method of claim 5, further comprising:

the first computer receiving an electronic message indicating user selection of the image attribute;

in response to receiving the user selection of the image attribute, the first computer displaying a widget through which a user specified image may be submitted;

the first computer receiving the user specified image via the widget;

in response to receiving the user specified image, the first computer overlaying the user specified image onto the product image.

7. The method of claim 6, wherein the graphical user interface is configured to accept user input performing one or more of: moving the user specified image to a particular location on the product image, rotating the user specified image, apply a filter to the user specified image, change an orientation of the user specified image, or edit the user specified image.

8. The method of claim 5, further comprising:

the first computer receiving an electronic message indicating user selection of the text attribute;

in response to receiving the user selection of the text attribute, the first computer displaying a widget through which user specified text may be submitted;

the first computer receiving the user specified text via the widget;

in response to receiving the user specified text, the first computer overlaying the user specified text onto the product image.

9. A non-transitory computer-readable storage medium storing one or more instructions which, when executed by one or more processors, cause the one or more processors to perform steps comprising:

a first computer causing display of a graphical user interface that depicts a product image of a customizable product on a second computer, wherein the graphical user interface depicts one or more annotations at respective locations within the product image, wherein each annotation of the one or more annotations is associated with a respective one or more attributes;

the first computer receiving a first electronic message indicating user selection of a particular annotation of the one or more annotations;

in response to receiving the user selection of the particular annotation, the first computer causing the graphical user interface to display one or more default attribute images corresponding to the respective one or more attributes associated with the particular annotation and one or more options associated with a particular attribute of the respective one or more attributes associated with the particular annotation;

the first computer receiving an electronic message indicating user selection of a particular option of the one or more options associated with the particular attribute;

in response to receiving the user selection of the particular option, the first computer:

determining that the particular option is not a default option of the particular attribute;

causing the graphical user interface to update the display of the one or more default attribute images to replace a default attribute image corresponding to the particular attribute with an attribute image associated with the particular option; and causing the graphical user interface to blur a portion of the product image that corresponds to the particular attribute, wherein the attribute image associated with the particular option is different than the default option of the particular attribute displayed in the blurred portion of the product image.

10. The non-transitory computer-readable storage medium of claim 9, wherein the steps further comprise:

the first computer receiving an electronic message indicating user selection of the default option;

in response to the first computer receiving the user selection of the default option, the first computer causing the graphical user interface to remove the blur from the portion of the product image that corresponds to the particular attribute.

11. The non-transitory computer-readable storage medium of claim 9, wherein the steps further comprise:

the first computer receiving an electronic message indicating user selection of a second particular attribute of the respective one or more attributes associated with the particular annotation;

in response to the first computer receiving the user selection of the second particular attribute, the first computer causing the graphical user interface to display a second one or more options associated with the second particular attribute.

12. The non-transitory computer-readable storage medium of claim 9, wherein the one or more options and the one or more default attribute images are displayed within the graphical user interface concurrently with the product image.

13. The non-transitory computer-readable storage medium of claim 9, wherein the graphical user interface includes an annotation that corresponds to a design area and is associated with one or more attributes that include one or more of: an image attribute or a text attribute.

14. The non-transitory computer-readable storage medium of claim 13, wherein the steps further comprise:
the first computer receiving an electronic message indicating user selection of the image attribute;
in response to receiving the user selection of the image attribute, the first computer displaying a widget through which a user specified image may be submitted;
the first computer receiving the user specified image via the widget;
in response to receiving the user specified image, the first computer overlaying the user specified image onto the product image.

15. The non-transitory computer-readable storage medium of claim 14, wherein the graphical user interface is configured to accept user input performing one or more of: moving the user specified image to a particular location on the product image, rotating the user specified image, apply a filter to the user specified image, change an orientation of the user specified image, or edit the user specified image.

16. The non-transitory computer-readable storage medium of claim 13, wherein the steps further comprise:
the first computer receiving an electronic message indicating user selection of the text attribute;
in response to receiving the user selection of the text attribute, the first computer displaying a widget through which user specified text may be submitted;
the first computer receiving the user specified text via the widget;
in response to receiving the user specified text, the first computer overlaying the user specified text onto the product image.

* * * * *